United States Patent [19]

Singh et al.

[11] Patent Number: 5,881,229
[45] Date of Patent: Mar. 9, 1999

[54] METHOD AND PRODUCT FOR ENCHANCING PERFORMANCE OF COMPUTER NETWORKS INCLUDING SHARED STORAGE OBJECTS

[75] Inventors: Jagdeep Singh, Cupertino; Chandrashekhar W. Bhide, Sunnyvale, both of Calif.

[73] Assignee: Shiva Corporation, Bedford, Mass.

[21] Appl. No.: 639,367

[22] Filed: Apr. 26, 1996

Related U.S. Application Data

[63] Continuation-in-part of Ser. No. 427,966, Apr. 26, 1995, Pat. No. 5,805,809.

[51] Int. Cl.[6] .................................................. G06F 17/00
[52] U.S. Cl. ........................................................ 395/200.33
[58] Field of Search .............................. 395/200.33, 47, 395/49, 800.3, 445

[56] References Cited

U.S. PATENT DOCUMENTS

| | | | |
|---|---|---|---|
| 4,941,084 | 7/1990 | Terada et al. | 395/674 |
| 5,046,027 | 9/1991 | Taaffe et al. | 395/153 |
| 5,109,515 | 4/1992 | Laggis et al. | 395/725 |
| 5,218,699 | 6/1993 | Brandle et al. | 395/650 |
| 5,222,224 | 6/1993 | Flynn et al. | 395/471 |
| 5,224,095 | 6/1993 | Woest et al. | 370/85.8 |
| 5,287,504 | 2/1994 | Carpenter et al. | 395/600 |
| 5,321,816 | 6/1994 | Rogan et al. | 395/242 |
| 5,452,447 | 9/1995 | Nelson et al. | 395/621 |
| 5,453,979 | 9/1995 | Schibler et al. | 370/60.1 |
| 5,491,780 | 2/1996 | Fyles et al. | 395/332 |
| 5,493,667 | 2/1996 | Huck et al. | 395/452 |
| 5,497,463 | 3/1996 | Stein et al. | 395/200.03 |

FOREIGN PATENT DOCUMENTS 9319420  9/1993  WIPO .

OTHER PUBLICATIONS

M. Satyanarayanan, "A Survey of Distributed File Systems," Annual Review of Computer Science, v. 4, Feb, 1989 pp. 1–26.

IBM. Technical Disclosure Bulletin, vol. 33, No. 12, May 1991. "Virtual Communication Subsytem"; pp. 279–284.

*Primary Examiner*—Ellis B. Ramirez
*Attorney, Agent, or Firm*—Townsend and Townsend and Crew LLP

[57] ABSTRACT

An installable performance accelerator for computer network distributed file systems is provided. A cache subsystem is added onto, or plugged into, an existing distributed file system with no source code modifications to the operating system. The cache subsystem manages a cache on the client computer side which traps or intercepts file system calls to cached files in order to obtain an immediate and substantial performance increase in distributed file system performance. Additionally, a refresh agent may be installed on the server side to further speed up cache accesses.

34 Claims, 19 Drawing Sheets

METHOD AND PRODUCT FOR ENCHANCING PERFORMANCE OF COMPUTER NETWORKS INCLUDING SHARED STORAGE OBJECTS

This application is a continuation-in-part of U.S. application Ser. No. 08/427,966, filed Apr. 26, 1996; U.S. Pat. No. 5,805,809.

BACKGROUND OF THE INVENTION

The present invention is related to computer networks and, more particularly, to a performance accelerator providing file caching and other techniques to accelerate network computers.

A large portion of the tremendous increase in performance seen in the microprocessor world over the last fifteen years can be attributed to better management of the microprocessor memory hierarchy. In particular, the technique known as caching alone is responsible for a large part of the performance improvement. In a common memory cache, recently accessed data from the relatively slow main memory of dynamic random access memory (DRAM) is stored in a cache of relatively fast static random access memory (SRAM). Performance increases are achieved when requested data is retrieved from the cache instead of the main memory.

Another form of caching involves storing recently accessed data from hard disks in main memory. Because the access speed of main memory is significantly faster than a hard disk access, disk caching provides substantial performance increases. A common disk caching program is Smart-Drive that is included in Microsoft Windows.

In the late 1980's, network designers also realized the benefits of caching and began to apply some of these techniques to this new domain in the form of network caching. Networks typically include a distributed file system which allows multiple computer systems to share data or files. The computer system that stores a file locally is called the server with client computer systems making requests to the server to remotely access the file. In network caching, a client computer system stores network data or files locally on a hard disk. Distributed file systems like AFS and CODA (both developed at Carnegie-Mellon University), Sprite (developed at the University of California, Berkeley), and several others include some form of network caching to produce better performing and more robust distributed file systems.

FIG. 1 illustrates a common microprocessor and data storage hierarchy. A central processing unit (CPU) 10 performs the operations of the computer using data stored in one of the storage media shown below the CPU. The storage media include a cache 12, main memory 14, hard disk 16, and network 18. The cache is a form of high speed memory that provides the quickest access time. Access times steadily decrease to the network which typically provides the slowest access time. A memory cache 20 involves storing data from the main memory in the cache. Similarly, a disk cache 22 (e.g., SmartDrive) involves storing data from the disk in main memory. Lastly, a network cache 24 involves storing data from the network on the hard disk.

The present invention is directed generally to improving network caching capabilities in computer networks. However, the above description does not imply that the different forms of caching operate individually. To the contrary, the different forms of caching typically operate together. For example, a file on the network may be cached on a local hard disk that is disk cached in main memory.

The fundamental idea behind caching, in both the memory, hard disk, and network worlds, is to keep a copy of recently accessed data in a faster storage area (the "cache") so that subsequent accesses to the same data proceed at a faster rate. Caching in a distributed file system involves having the client computer system store locally a copy of the data or file that resides on the server. The concept of locality of reference states that there is a high probability that data will be reused soon after its first use. By obtaining a local copy of the data or file, a client computer system can avoid many further interactions with the server.

References within a file typically exhibit spatial locality meaning that if a block of a file is read, there is high probability that succeeding blocks will also be read. A client computer system can take advantage of spatial locality by caching the entire file or by requesting successive blocks of a file while a block is being processed. By taking advantage of both locality of reference and spatial locality, caching results in much faster overall performance for the client computer system.

However, prior art cache systems for distributed file systems are inherently a part of the server operating system. For example, AFS, CODA, and Sprite are all "built" or "compiled" into the UNIX kernel. Thus, to obtain the benefits of these systems, one needs to install the entire operating system on at least the server side and generally also on the client side of the distributed file system. However, installing a new operating on both the client and server sides is not generally feasible in a commercial setting because the process is very time consuming and existing applications may be incompatible with the new operating system.

Prior art cache systems are built into the operating system for a number of reasons including the following:

(a) It is difficult to maintain cache coherency between the client and server computer systems if the cache system is not a part of the server operating system. This is because the server needs to let the client know what data has been modified to maintain cache coherency, but if the cache system is not a part of the operating system, the operating system generally does not know data has been modified.

(b) The cache system is such an integral part of the file system (which is part of the operating system) that it is much easier to design them in conjunction.

(c) The programmers working on cached distributed file systems have typically been in academic rather than commercial environments, where they have had full access to the source code of the operating system and thus have no reservations about modifying the source code to suit their needs.

What is needed is a performance accelerator that provides file caching for distributed file systems without requiring modification of the server distributed file system or operating system. The present invention fulfills this and other needs.

SUMMARY OF THE INVENTION

The present invention provides an innovative approach to caching for distributed file systems which allows the cache subsystem to be added onto, or plugged into, an existing distributed file system with no source code modifications to the operating system. With the present invention the source code of the server operating system does not need to be modified or even analyzed to get a substantial performance increase on the client computer system. Additionally, the server is not required to trap file system calls. For example, a client user of DOS or Windows, running under a distributed file system such as Novell NetWare, Banyan Vines, Microsoft LAN Manager, or any other distributed file system can install the cache subsystem of the present invention into their computer and obtain an immediate and substantial performance increase.

In an embodiment of the present invention, a method of accelerating performance of a client computer comprises the steps of: an application on the client computer issuing a system call to be sent to the server computer over the network link; a cache subsystem on the client computer intercepting the system call on the client computer before the system call is sent over the network Link, the cache subsystem being separate from an operating system of the client computer; the cache subsystem determining if the system call is capable of being serviced locally utilizing a cache on the client computer; servicing the system call on the client computer if the system call is serviceable locally; and sending the system call to the server computer if the system call is not serviceable locally. Additionally, the results of a system call that is not serviceable locally may be stored in the cache on the client computer.

The present invention also provides optimization for increasing the performance achieved from utilization of the cache. Some of the optimization exploit a refresh agent that resides on the server. The refresh agent may, for example, calculate checksums for data residing on the server in order to determine if the data residing on the client computer system is stale.

One aspect of the present invention allows a cache subsystem to be installed on a client computer to intercept file system calls and serve them locally with a cache. Another aspect of the present invention is a performance accelerator that intercepts both file and non-file system calls on the client computer to serve the calls locally. Yet another aspect of the present invention accelerates the transmission of system calls to the server side over a low bandwidth link.

Other features and advantages of the present invention will become apparent upon a perusal of the remaining portions of the specification and drawings.

DESCRIPTION OF THE PREFERRED EMBODIMENT

Definitions
- uncached blocks—Blocks that have never been fetched. All blocks start out uncached.
- valid blocks—Blocks that have been fetched and are known to be valid (i.e., the information in the blocks is known to be consistent with the server).
- invalid blocks—Blocks that have been fetched before but have been marked invalid because the information in the blocks may not be valid. Invalid blocks can be validated by checking with the server whether the information in the blocks is correct, typically by comparing checksums of the cached blocks and the current blocks on the server.
- discarded blocks—Blocks that have been fetched but are known to be inconsistent with the server and therefore will need to be refetched (i.e., the blocks cannot be validated like invalid blocks). Discarded blocks are generally treated like uncached blocks.
- deny-write mode—One of the file open sharing modes which prevents the file from being written to by another user/process including compatibility, deny-all, and deny-write.
- allow-write mode—One of the file open sharing modes which allows the file to be written to by another user/process including deny-read and deny-none.

Description

In the description that follows, the present invention will be described in reference to IBM personal computer systems running DOS/Windows and Novell NetWare as the operating system and network operating system, respectively. The present invention, however, is not limited to any particular environment or any particular application. Instead, those skilled in the art will find that the system and methods of the present invention may be advantageously applied to a variety of systems, including different platforms and environments. Therefore, the description the embodiments that follow is for purposes of illustration and not limitation.

Figure 1:
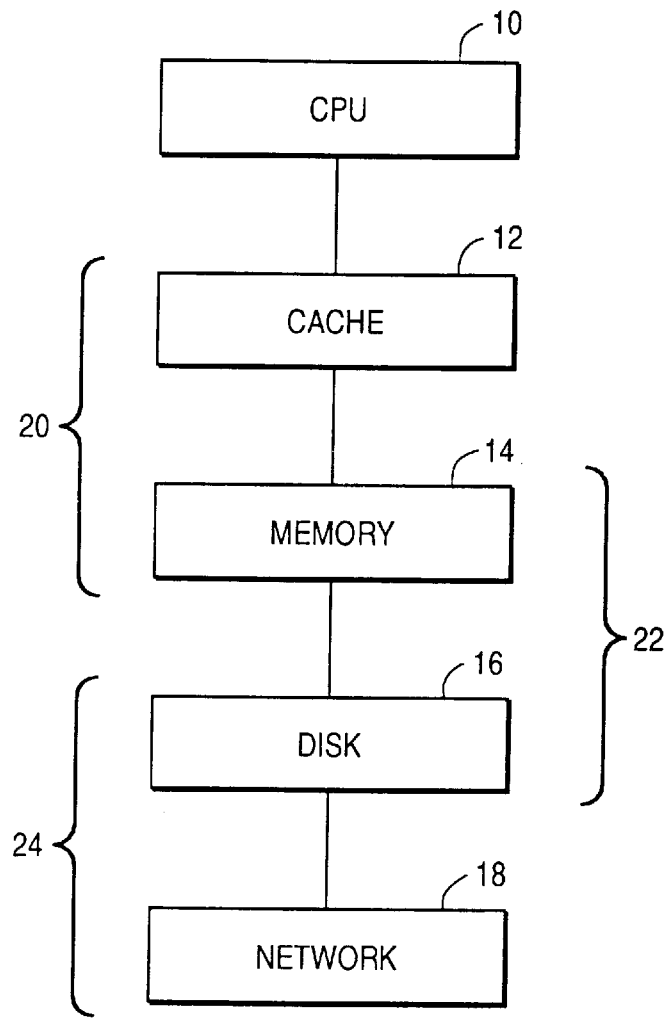
FIG. 1 illustrates a common microprocessor and data storage hierarchy.
Figure 2:
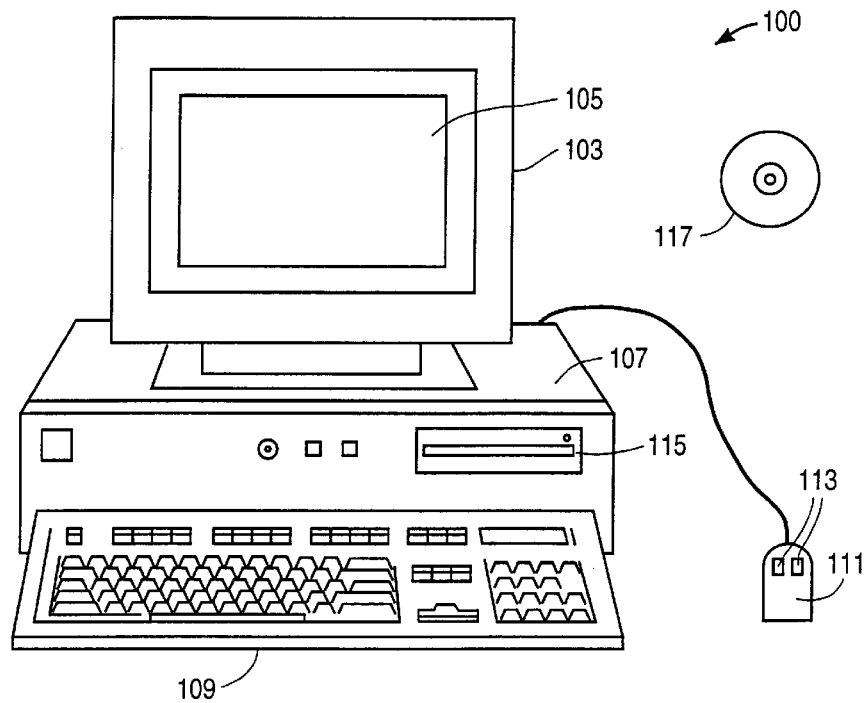
FIG. 2 illustrates an example of a computer system used to execute the software of the present invention.

FIG. 2 illustrates an example of a computer system used to execute the software of the present invention. FIG. 2 shows a computer system 100 which includes a monitor 103, screen 105, cabinet 107, keyboard 109, and mouse 111. Mouse 111 may have one or more buttons such as mouse buttons 113. Cabinet 107 is shown housing a CD-ROM drive 115 for reading a CD-ROM disk 117. Cabinet 107 also houses familiar computer components (not shown) such as a processor, memory, disk drives, and the like.

Figure 3:
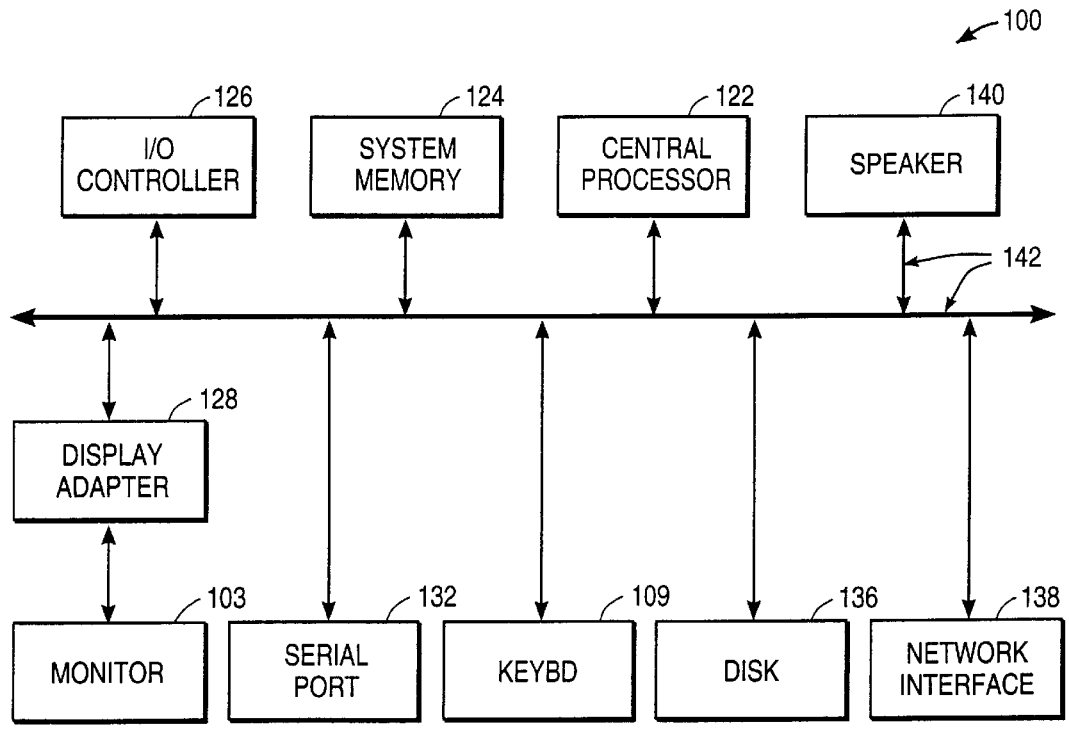
FIG. 3 shows a system block diagram of a typical computer system used to execute the software of the present invention.

FIG. 3 shows a system block diagram of computer system 100 used to execute the software of the present invention. As in FIG. 2, computer system 100 includes monitor 103 and keyboard 109. Computer system 100 further includes subsystems such as a central processor 122, system memory 124, I/O controller 126, display adapter 128, serial port 132, disk 136, network interface 138, and speaker 140. Computer readable media such as memory, hard disks, floppies, CD-ROMs, tapes, flash memory, and the like may be used to store a computer program including computer code that implements the present invention. Other computer systems suitable for use with the present invention may include additional or fewer subsystems. For example, another computer system could include more than one processor 122 (i.e., a multi-processor system) or a system may include a cache memory.

Arrows such as 142 represent the system bus architecture of computer system 100. However, these arrows are illustrative of any interconnection scheme serving to link the subsystems. For example, speaker 140 could be connected to the other subsystems through a port or have an internal direct connection to central processor 122. Computer system 100 shown in FIG. 3 is but an example of a computer system suitable for use with the present invention. Other configurations of subsystems suitable for use with the present invention will be readily apparent to one of ordinary skill in the art.

Figure 4:
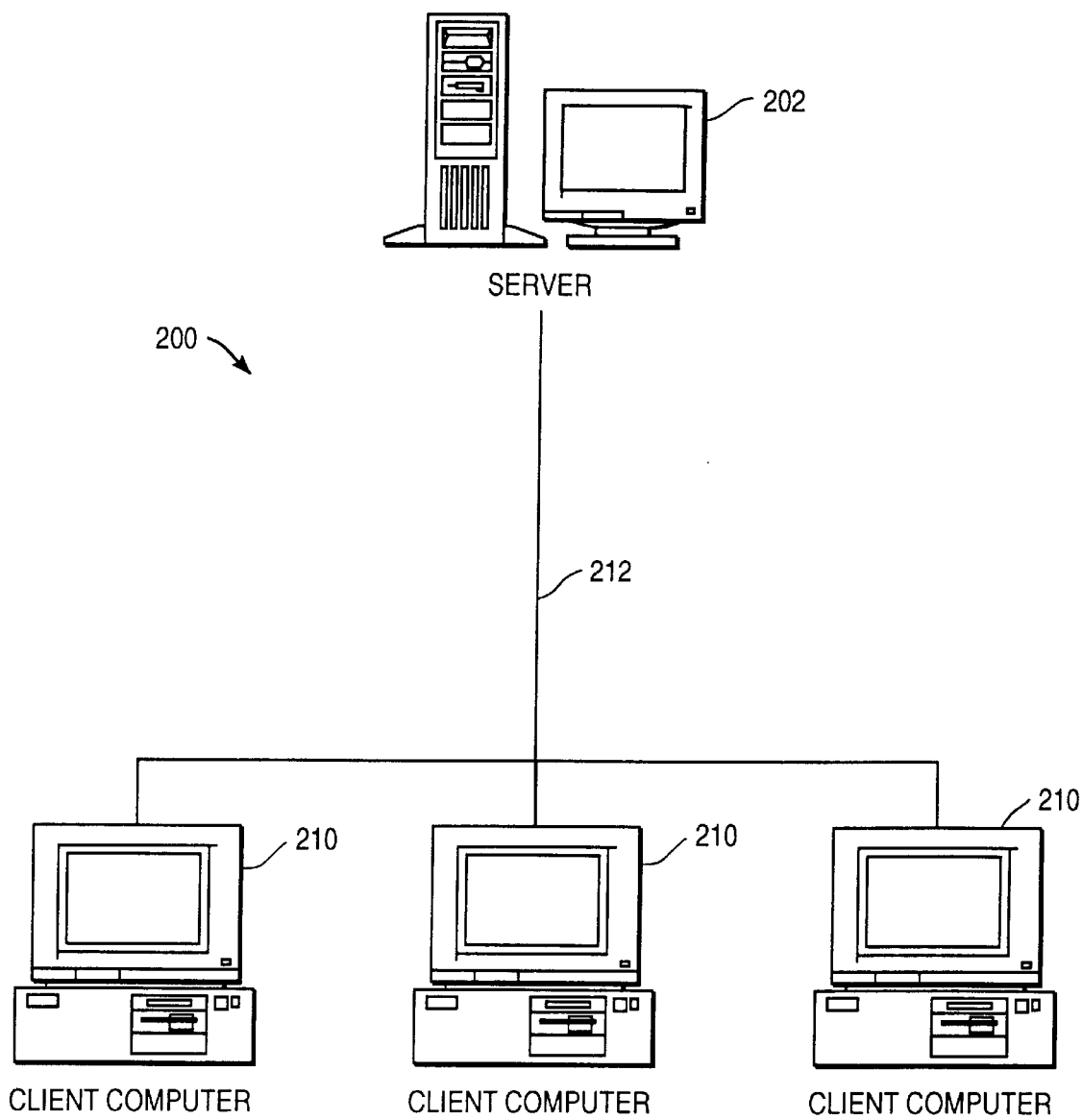
FIG. 4 shows a network diagram of a typical distributed file system.

FIG. 4 shows a network diagram of a typical distributed file system. A distributed file system 200 includes a server 202. The server is typically a relatively high speed data processor that includes a large storage space for data or files that will be requested by client systems. The server is electrically connected to client computers 210 by a local area network (LAN) 212. The server and client computers communicate and exchange data or files over the LAN. Although FIG. 4 illustrates a typical distributed file system, the present invention may be utilized on any server/client computer environment.

Figure 5:
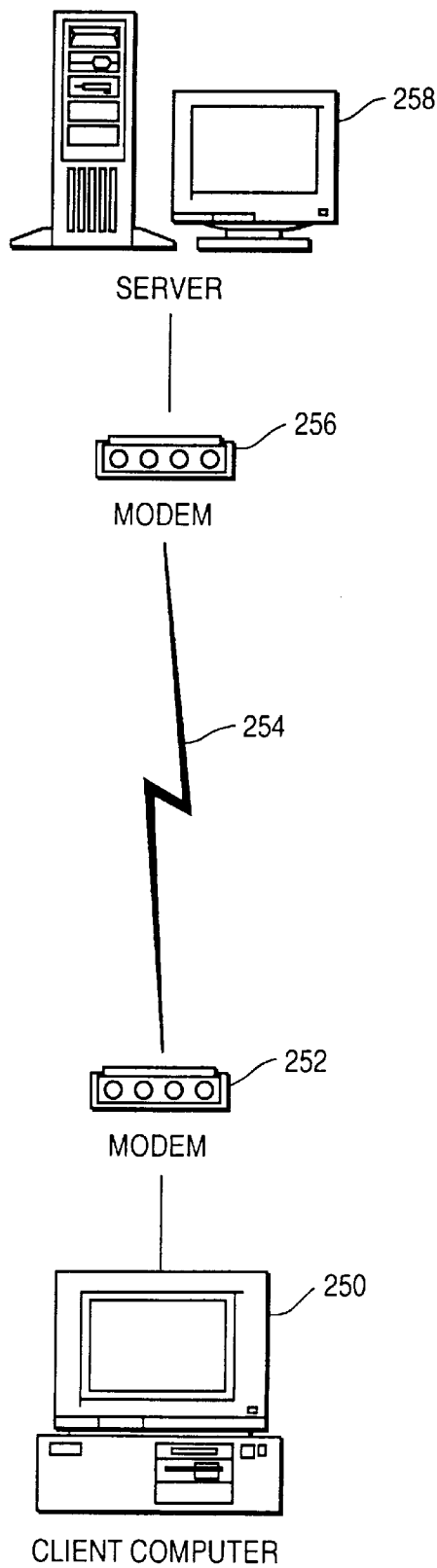
FIG. 5 shows remote access to a server by a client computer system.

FIG. 5 shows remote access to a server by a client computer system. A client computer 250 is connected to a modem 252. Modem 252 communicates over a telephone line 254 to a modem 256, which is electrically connected to a server 258. The client computer is able to remotely access data or files on the server through the modem link. However, these accesses are significantly slower than local accesses because of the low bandwidth link of telephone line 254. Thus, a user of a client computer will notice a dramatic decrease in performance when accessing data on the server. Although the client computer is shown remotely accessing a single server computer, the client computer may also remotely access a LAN including one or more servers.

Figure 6:
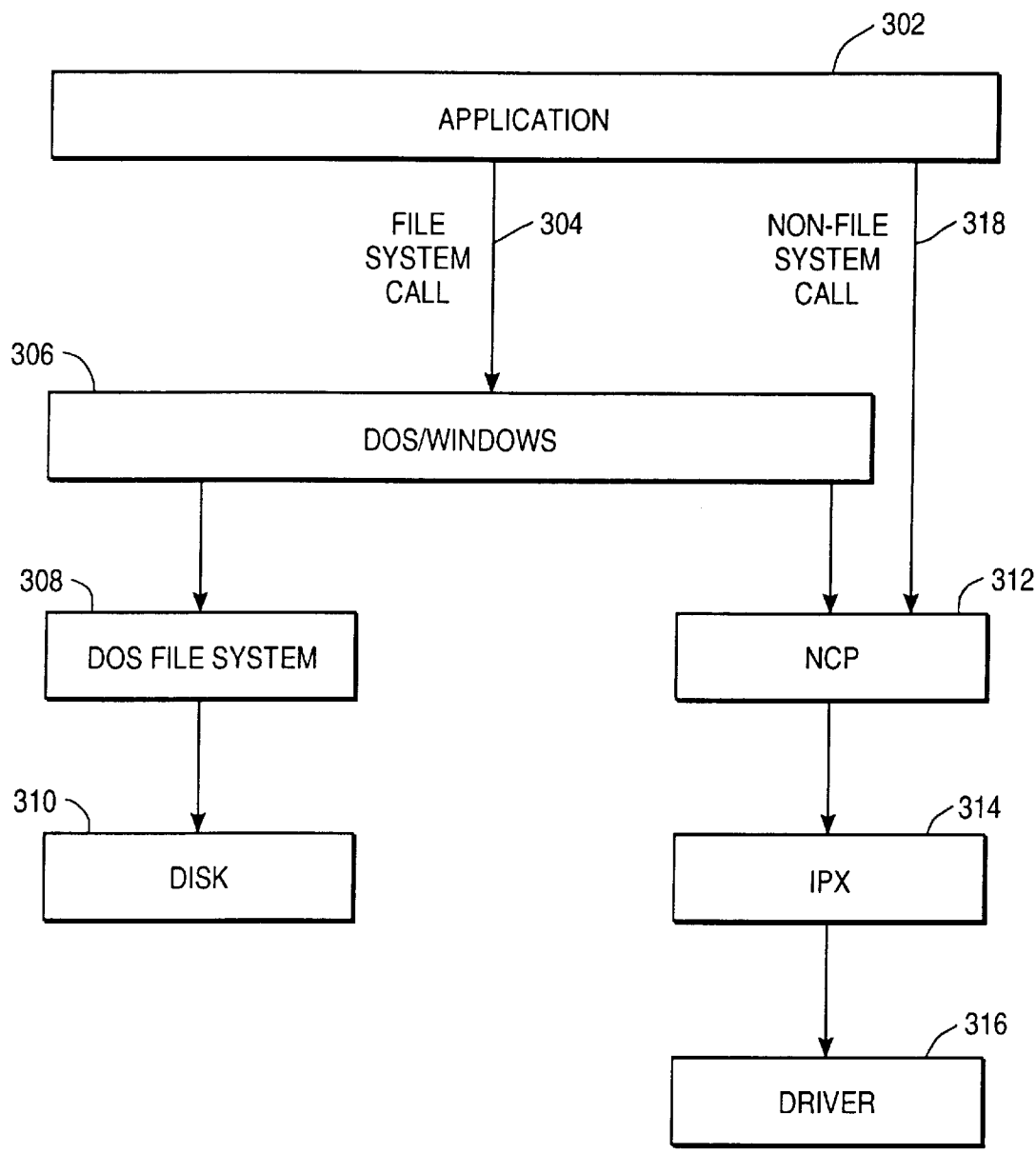
FIG. 6 shows the software hierarchy on a typical client computer in a distributed file system.

FIG. 6 shows the software hierarchy on a typical client computer in a distributed file system. At the highest level, a user is interacting with an application 302. The application accesses files by making a file system call 304 to the operating system 306. The operating system determines whether the file system call references a local or remote file. If the file system call references a local file, the operating system makes a file system call to the local file system 308. The local file system then accesses a local disk drive 310 to fulfill the file system call. Although the local disk drive is not software, it is shown to aid the reader in understanding the software hierarchy.

If the file system call references a remote file (i.e., one located on the server), the operating system makes a file system call to a network protocol 312. In the Novell NetWare environment, the network protocol is called the NetWare Core Protocol (NCP). The network protocol makes a request to a network board-specific protocol 314. In the Novell NetWare environment, the network board-specific protocol may be the Internetwork Packet Exchange (IPX), Sequenced Packet Exchange (SPX), Transmission Control Protocol/Internet Protocol (TCP/IP), and the like. The network board-specific protocol then makes a request to a network driver 316. The network driver is the software that controls the transmission and receipt of information over the network hardware between the server and client computer.

Additionally, the application communicates over the network by making a non-file system call 318 to the network protocol. A non-file system call bypasses operating system 306 (or file system) and interacts directly with the network protocol. The non-file system calls may be calls to network Application Programming Interfaces (APIs) like WinSock, NetBIOS, NetWare Sockets, and the like. Therefore, a performance accelerator for a networked computer will preferably address both file and non-file system calls.

Figure 7:
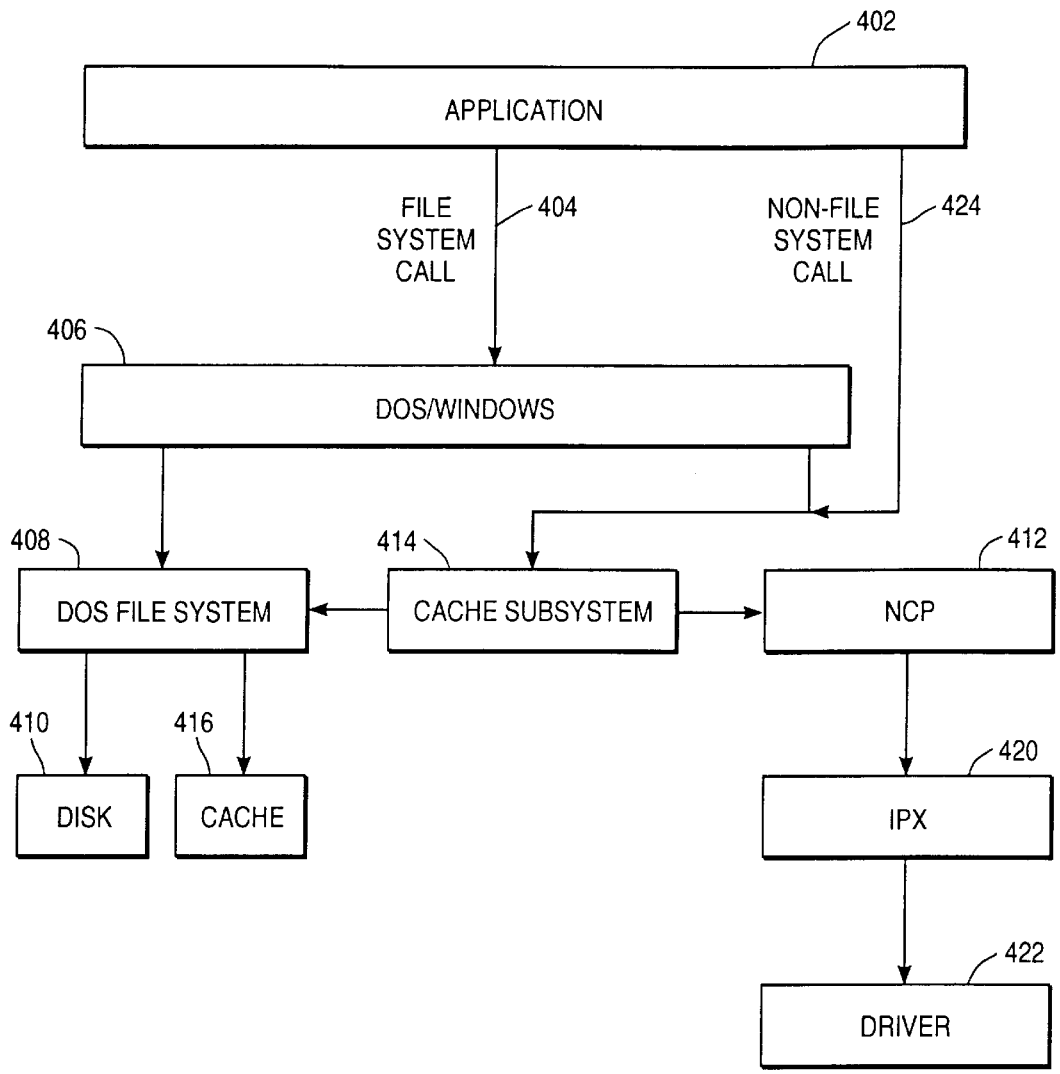
FIG. 7 shows the software hierarchy on a client computer according to the present invention.

FIG. 7 shows the software hierarchy on a client computer according to the present invention. At the highest level, a user is interacting with an application 402. The application accesses files by making a file system call 404 to the operating system 406. The operating system determines whether the file system call references a local or remote file. If the file system call references a local file, the operating system makes a file system call to the local file system 408. The local file system then accesses a local disk drive 410 to fulfill the file system call.

If the file system call references a remote file (i.e., one located on the server), the operating system makes a file system call to the network protocol 412. However, in the present invention, a cache subsystem 414 traps the call to the network protocol thereby intercepting the call before it gets to the network protocol. Trapping is a standard operating system mechanism that is implemented according to the appropriate operating system. For example, under DOS and Windows, the mechanism is the redirector interface. The mechanism is the Virtual File System (VFS) interface under UNIX and the Installable File System (IFS) interface under Windows 95, Windows NT and OS/2. These mechanisms are well documented and readily available.

The cache subsystem (or accelerator subsystem) is non-operating system software that maintains information that allows remote files or blocks to be cached on the local file system. When data in the form of a file or block of a file is received from the server, the data is stored in a local cache 416. The cache is shown separate from the local disk drive but will typically be a portion of the local disk drive. When cache subsystem 414 traps a request meant for the network protocol, the cache subsystem analyzes the request and determines if the request may be satisfied by accessing data stored locally in the cache. Satisfying the request by accessing the local cache provides a significant increase in client computer performance. The present invention accomplishes this without modifying the operating system or requiring the server to trap system calls.

In a preferred embodiment, the cache subsystem traps file system calls using the DOS redirector interface. Initially, the NETWORK bit of the Current Directory Structure (CDS) for the hard drive to be accelerated by the cache is set. The CDS is an internal data structure DOS maintains about each drive letter. If the NETWORK bit of the CDS is set, DOS passes all file system calls on that drive to the cache subsystem instead of the network protocol. This enables the cache subsystem to trap file system calls that would be ultimately processed by the server.

If cache subsystem 414 determines that the data requested by the file system call is not stored locally in the cache or the data in the cache is stale, the cache subsystem sends the system file call to the network protocol so that the data can be accessed from the server. In order to send the system call to the network protocol, the NETWORK bit of the appropriate CDS is returned to the state it was before it was set by the cache subsystem and a bit in global memory is set to indicate that the next file system call should be allowed to chain on to the next interrupt handler, the network protocol. Setting the NETWORK bit to its original state is preferable because the bit may have been off (not set) so that the client computer could intercept file system calls (i.e., interrupt 21H in DOS) before they go through DOS. Alternatively, the NETWORK bit may have been on (set) so that the file system calls on the client computer system would go through DOS. Also, the bit in global memory should be set because otherwise the cache subsystem of the present invention would receive the file system call again.

Once the file system call is received by network protocol 412, the network protocol makes a request to a network board-specific protocol 420. The network board-specific protocol then makes a request to a network driver 422, which is the software that controls the transmission and receipt of information over the network hardware between the server and client computer. The request is sent to the server via the network hardware so that the server can access the requested data and send it back to the client computer over the network.

Additionally, the application communicates over the network by making a non-file system call 424 to the network protocol. A non-file system call bypasses operating system 406 (or file system) and interacts directly with the network protocol. The non-file system calls may be calls to network Application Programming Interfaces (APIs) like WinSock, NetBIOS, NetWare Sockets, and the like. Since the non-file system calls by-pass the file system, a different mechanism is utilized to trap non-file system calls. Under Microsoft Windows, the present invention traps non-file system calls by replacing an application's standard Dynamic Linked Library (DLL) with a DLL that allows the present invention to trap non-file system calls. Thus, non-file system calls may be trapped and accelerated without making modifications to the application; the application continues to write to the APIs it always writes to and the present invention traps those API calls and sends them to the server (or Refresh Agent described later) using its optimized protocol.

The present invention can provide client side caching on either a block basis, region basis or whole-file basis. In a preferred embodiment, the type of caching is user selectable. The following description will focus on block caching; however, the same concepts apply to whole-file caching as it is conceptually a special case of block caching where the block size is very large. The region caching can be treated conceptually as a special case of block caching where block size is variable.

Figure 8A:
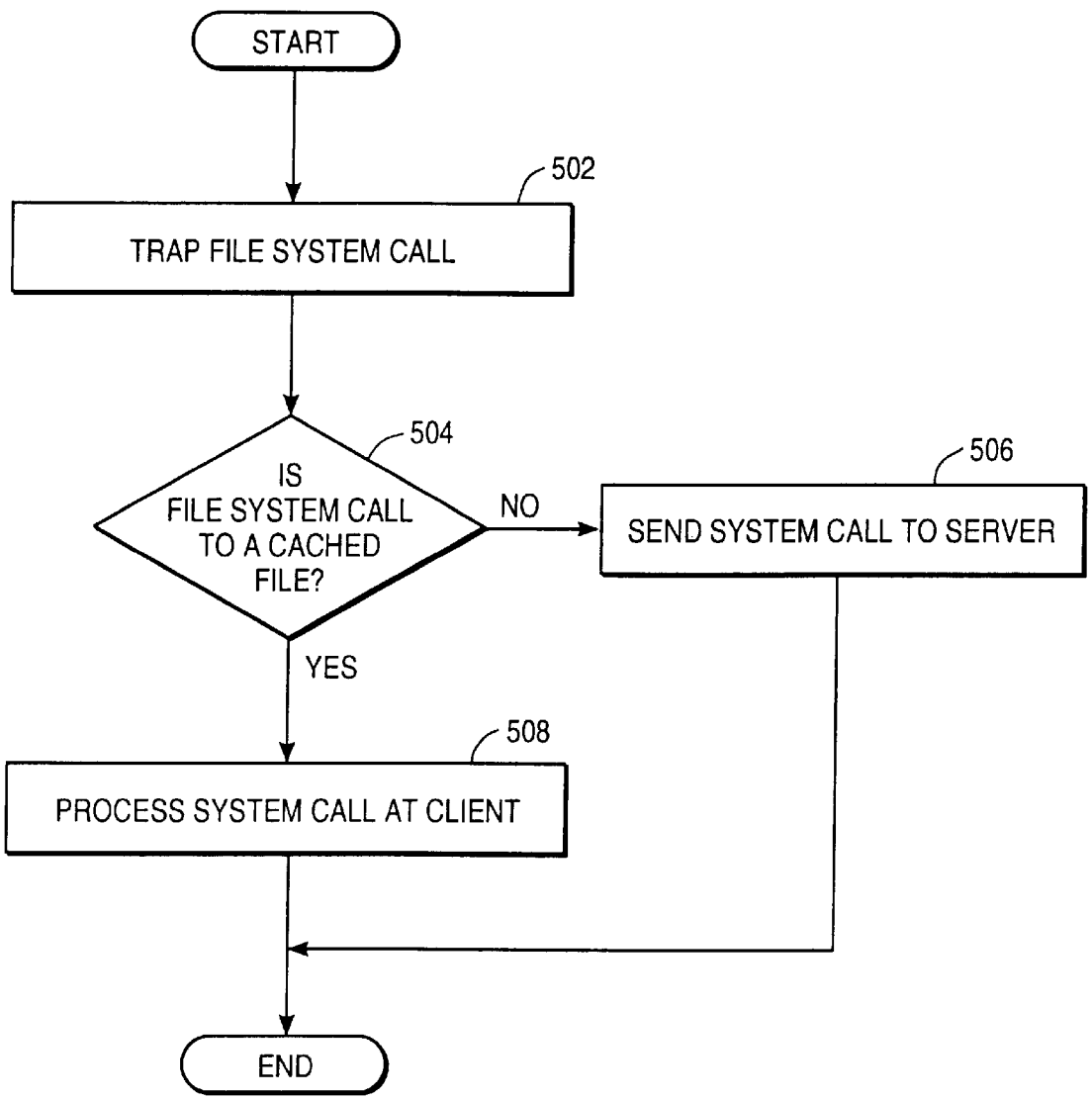
FIG. 8A illustrates a high level flowchart of the operation of the cache subsystem.

FIG. 8A illustrates a high level flowchart of the operation of the cache subsystem. At step 502, the cache subsystem traps a file system call that specifies a file on the server. The cache subsystem then determines if the file system call can be serviced locally (e.g., the file system call specifies a file that is cached or will be cached for a file open) on the client computer at step 504. If the file system call cannot be serviced locally, the cache subsystem sends the file system call to the server via the network as described above. The file system call is sent to the server at step 506. In a preferred embodiment, the NETWORK bit of the appropriate CDS is returned to the state it was before it was set by the cache subsystem and a bit in global memory is set to indicate that the next file system call should be allowed to chain on to the next interrupt handler, the network protocol. The results of the system call are typically saved in the cache for subsequent access.

If the file system call can be serviced locally, the cache subsystem will process the file system call on the client side with little or no interaction with the server side. The cache subsystem processes the file system call at step 508. Since the file system call may specify many different kinds of operations on the cached file, the steps involved for each operation will be discussed in reference to the remaining figures.

The cache subsystem maintains two local files that contain information about a cached file. In a preferred embodiment, one file has a ".FCD" extension and the other has a ".FCI" extension. The FCD file contains all the cached blocks for the particular file. The FCI file contains information about the file on the server and index information into the FCD file.

The FCI file has a file header which contains the following information:

| | |
|---|---|
| Mode | mode in which the file was opened |
| Size | size of the file on the server |
| lMod | last modification time on the server |

The FCI file also contains information about the blocks that have been cached. For each cached block in the FCD file, there is an associated plain block in the FCI file which contains the following information:

| | |
|---|---|
| Offset | offset in the FCD file where the block is cached |
| lModBlock | time the cached block was fetched from the server |
| bBlockWasWritten | a flag to indicate if the block contains partially unflushed writes |

In a preferred embodiment, the FCI file also contains base blocks which provide an indexing function for the plain blocks and therefore, the cached blocks in the FCD file. The base blocks have levels associated with them. Each base block of level 1 or greater contains four offsets within the FCI file of a base block of lower level. Each base block of level 0 contains four offsets within the FCI file pointing to plain blocks which reference cached blocks in the FCD file. Cached blocks are added, updated, or searched using a variation of a binary search protocol starting at the top level of base blocks in the FCI file and descending down until level 0 is reached. The base block at level 0 references a plain block that is used to access or update data in the cached block in the FCD file.

Figure 8B:
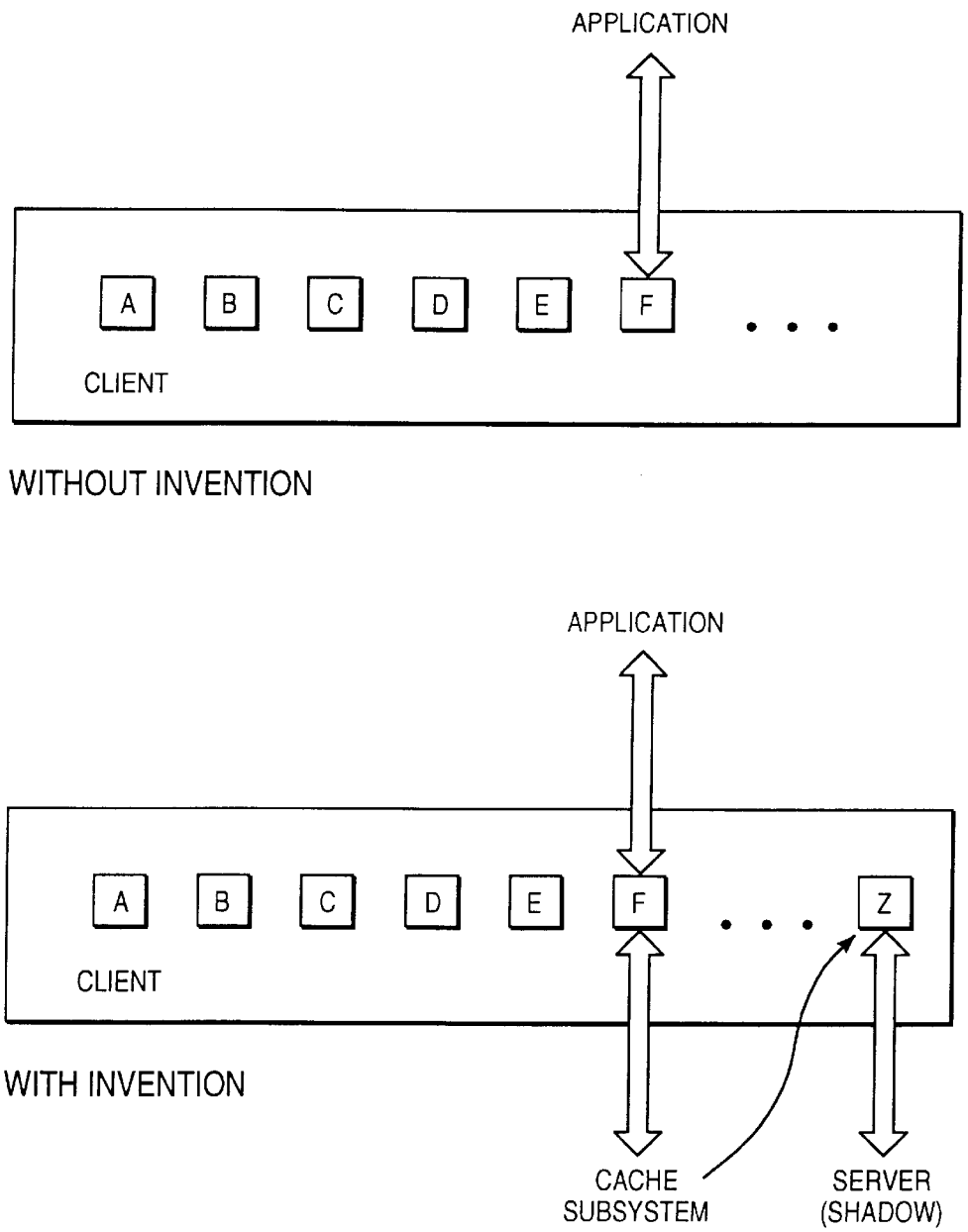
FIG. 8B illustrates an alternative method of intercepting file system calls.

FIG. 8B illustrates an alternative way of intercepting file system calls. In some networking environments it is impossible or impractical to trap file system calls. For example, if the client computer system is operating under Windows for Workgroups (Windows 3.11) and the server is operating under Windows NT, there is no hook for the client computer system to assume control during an access request (i.e., there is no support for the Int2F file system hook for access to the shared storage objects on the NT Advanced Server).

Accordingly, the present invention may shadow the drive for the file system in order to intercept the file system calls.

The top portion of FIG. 8B shows that the client computer system accesses the file system on the server through the drive letter "F". The drive letter designation may vary in different embodiments but this example will illustrate this aspect of the present invention.

As shown on the bottom portion of FIG. 8B, when an entity (or distributed application) requests the client computer system to accelerate a named shared storage object like F, the client assigns a new "shadow" name to the shared storage object. Typically, the new shadow name will be a drive letter that is available on the system but is currently not being used (e.g., the drive letter "Z" as shown). The cache subsystem is configured to receive file system calls to the original name of the shared storage object.

When an entity subsequently accesses the original name, the cache subsystem receives control, thereby preempting the file system calls. The cache subsystem may then respond to each access request directly or in conjunction to requests to the underlying shared storage object which is accessed through the use of the shadow name.

Figure 8C:
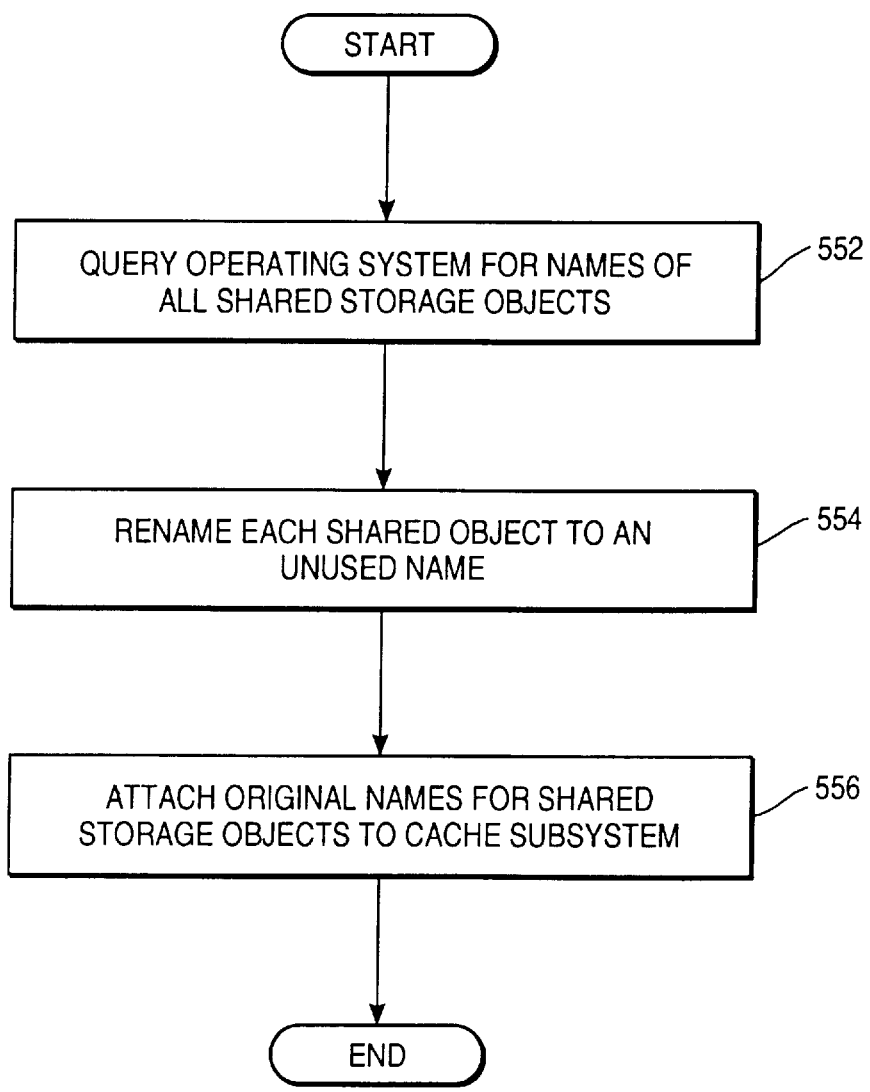
FIG. 8C illustrates a flowchart of the alternative method of intercepting file system calls.

FIG. 8C illustrates a flowchart of the alternative method of intercepting file system calls. Upon activation at step 552, the client computer system queries the operating system to determine the names of all the shared storage objects.

The client computer system then renames each of these shared storage objects to an unused name at step 554. In a typical environment, the unused names will be later in the alphabet. These new names may be hidden from applications or users if this capability is available in the operating environment so that these names may only be employed by the cache subsystem.

At step 556, the client computer system recreates the original names assigned to the shared storage objects. The cache subsystem will then receive any access calls to the original names, allowing the cache subsystem to "hook" to the shared storage object access requests. The client computer system then operates normally, hooking the storage object requests, and servicing them with a combination of local operations and accesses to the underlying shared storage objects using the shadow name.

Figure 9:
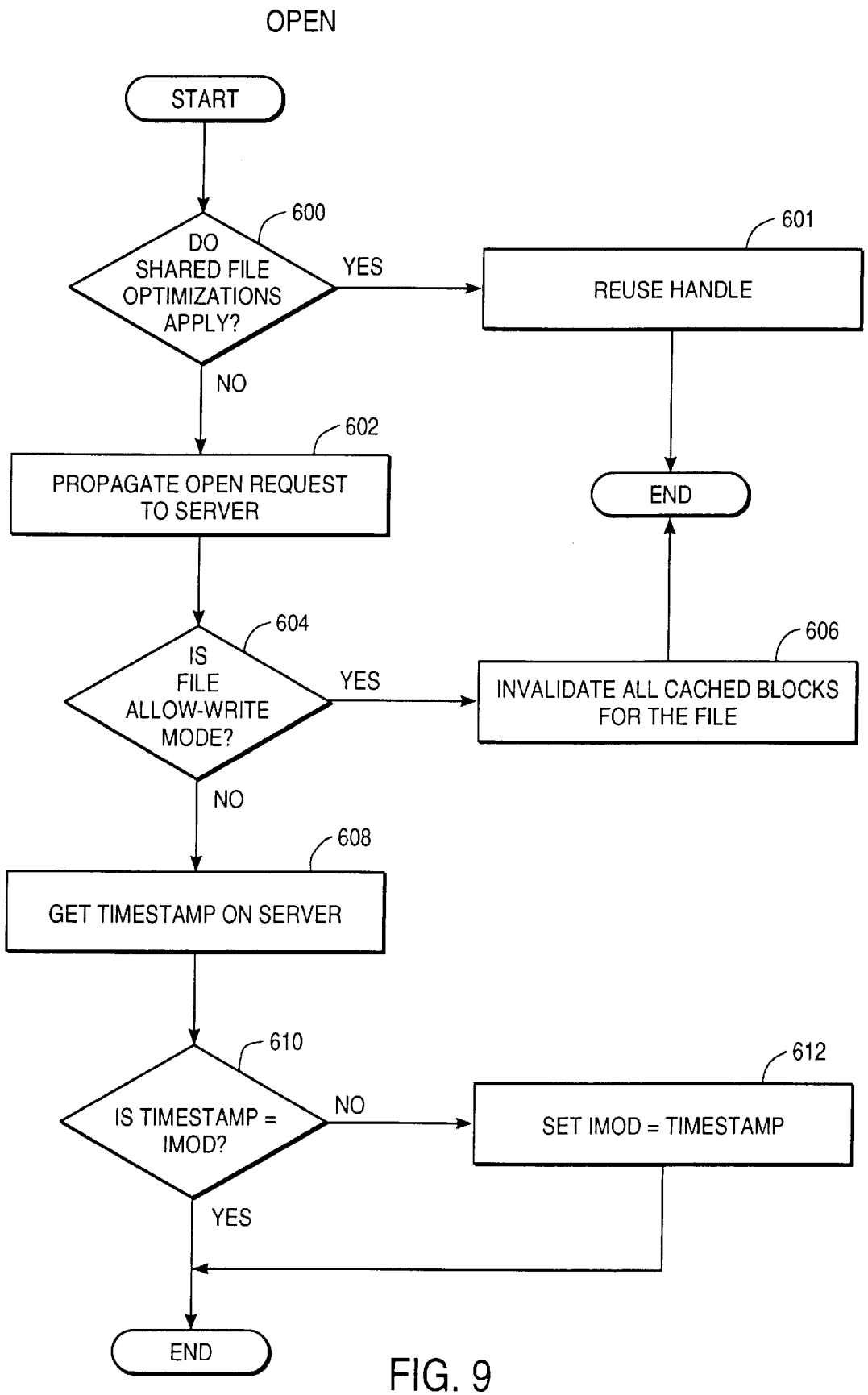
FIG. 9 illustrates a flowchart of a file system call that opens a file.

FIG. 9 illustrates a flowchart of a file system call that opens a file. At step 600, the cache subsystem determines if shared file optimizations apply. Each file system operation which opens a file on the shared storage object requires a round trip to the server, accordingly it would be beneficial to avoid this whenever possible. The present invention achieves higher performance by not opening a file on the shared storage device in certain circumstances.

If the entity opens two files with the same NamingInformation, where NamingInformation is the information that designates a file, one file open operation is sufficient. Thus, if the entity performs the following sequence of operations:

FileOpen1 (NamingInformation1)
Any file system operation which does not Close the file with NamingInformation1
FileOpen2 (NamingInformation1) Then it is permissible for the cache subsystem to return a dummy file handle (DummyHandle) to the entity for FileOpen2 and for the client computer system to reuse Handle1 from File-Open1 for shared storage object accesses which refer to the DummyHandle. At step 601, the cache subsystem reuses the file handle. In this manner, the present invention is able to achieve better performance.

In one embodiment, the cache subsystem determines if an entity performs a FileOpen2 with NamingInformation1 AND the entity already has Handle1 with NamingInformation1 AND AccessPermissions1 for Handle1 are compatible with AccessPermissions2 requested in FileOpen2. If the preceding is true, the cache subsystem creates a DummyHandle and does not make any network requests to the shared storage object on the server.

Data Access to Handle1 or DummyHandle may be performed the client computer system doing a seek operation to set the current seek position prior to each data access through a handle. This is a local operation and does not go over the communications line to the shared storage object. The data access file system operation is then performed through the handle. After each data access through a handle, the client computer system updates the current seek position for that handle.

When closing a handle, the cache subsystem may determine if any other handle (e.g., Handle1 or DummyHandle) are open. If so, then the file system operation FileClose is recorded in the client computer system only. Otherwise, the file system operation FileClose is executed normally.

Without this optimization, the only difference between Handle1 and Handle2 is the current seek position. If the client computer system maintains CurrentSeekPosition1 for Handle1 and CurrentSeekPosition2 for DummyHandle AND properly sets the current seek position prior to any file system operation which uses Handle1 or DummyHandle, the entity will operate the same as without the invention, except performance will be increased.

If the shared file optimizations do not apply, the cache system propagates the file open request to the server at step 602. Distributed file systems typically include different share permissions to coordinate access to shared files. For DOS/Windows, these permissions may include compatibility, deny-all, deny-write, deny-read, and deny-none. The share permission specified in the file system call is propagated to the server.

At step 604, the cache subsystem determines whether the file is opened in allow-write mode. If the file is opened in allow-write mode, the cache subsystem invalidates all the cached blocks for the file at step 606. Otherwise, the cache subsystem requests the timestamp of the file on the server at step 608. Once the timestamp of the file is received, the timestamp is compared to the variable 1Mod in the FCI file at step 610. If 1Mod is not equal to the timestamp, 1Mod is set equal to the timestamp at step 612.

Figure 10A:
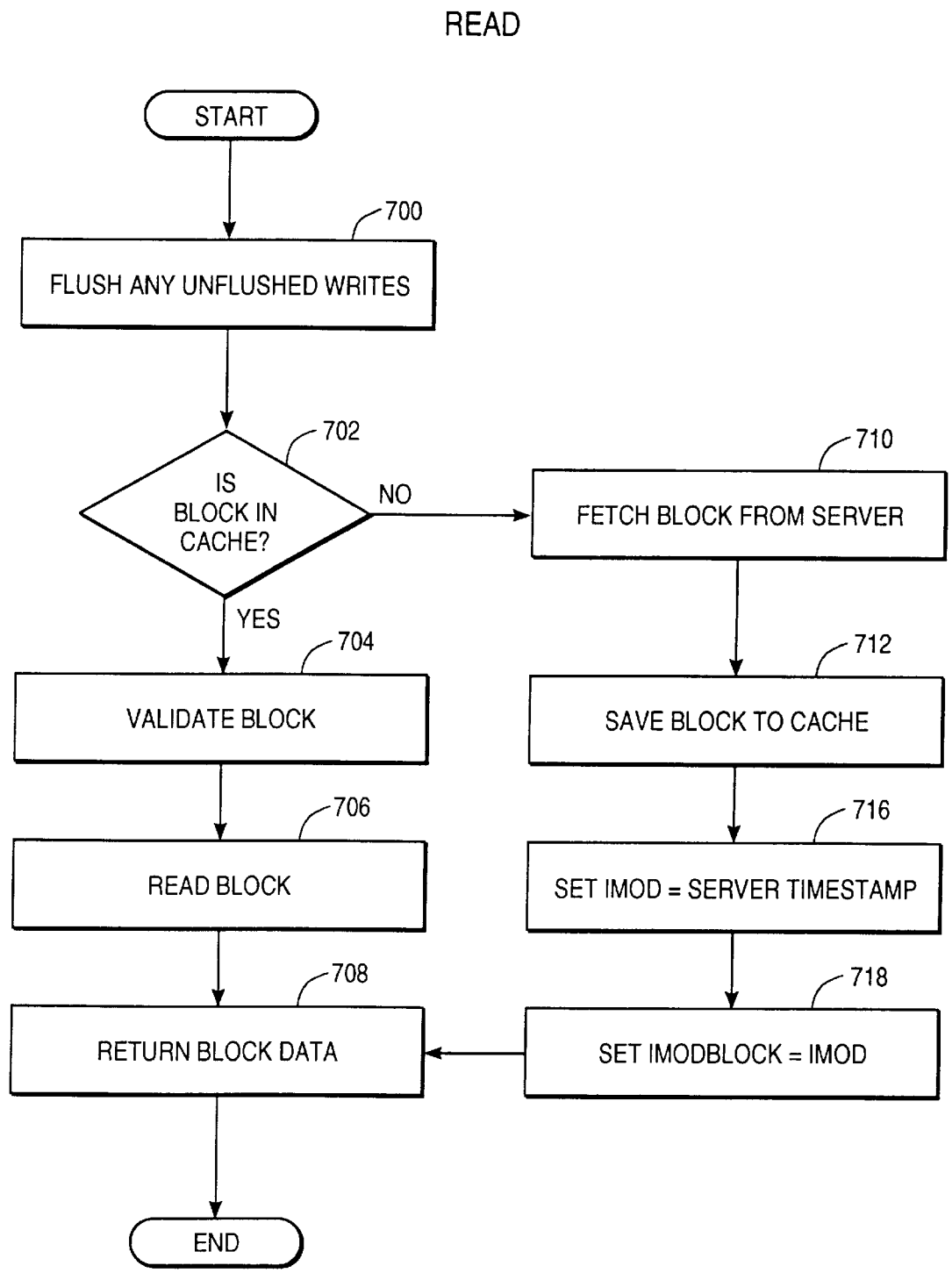
FIG. 10A illustrates a flowchart of a file system call that reads a block of a cached file.

FIG. 10A illustrates a flowchart of a file system call that reads a block of a cached file. If the block contains any unflushed writes (e.g., as indicated by the variable bBlockWasWritten), the cache system flushes all unflushed writes at step 700. At step 702, the cache subsystem determines if the requested block is in the cache. If so, the cache subsystem validates the data in the cached block at step 704. The validation process will be described in more detail in reference to FIG. 10B. However, if the data in the cached block is known to be valid then the cache subsystem does not need to validate the block. Once the cached block is validated, the cached block is read from the FCD file at step 706. The data from the cached block is returned to the requesting application at step 708.

If the cache subsystem determines that the requested block is not in the cache (or not valid), the cache subsystem fetches the block from the server at step 710. A block is fetched from the server by issuing a file system call to the network protocol to retrieve the block. After the block is received by the cache subsystem, the block is saved to the cache at step 712. At step 716, 1Mod is set equal to the timestamp of the file on the server. The variable 1ModBlock in the associated plain block of the FCI file is set equal to 1Mod at step 718.

Figure 10B:
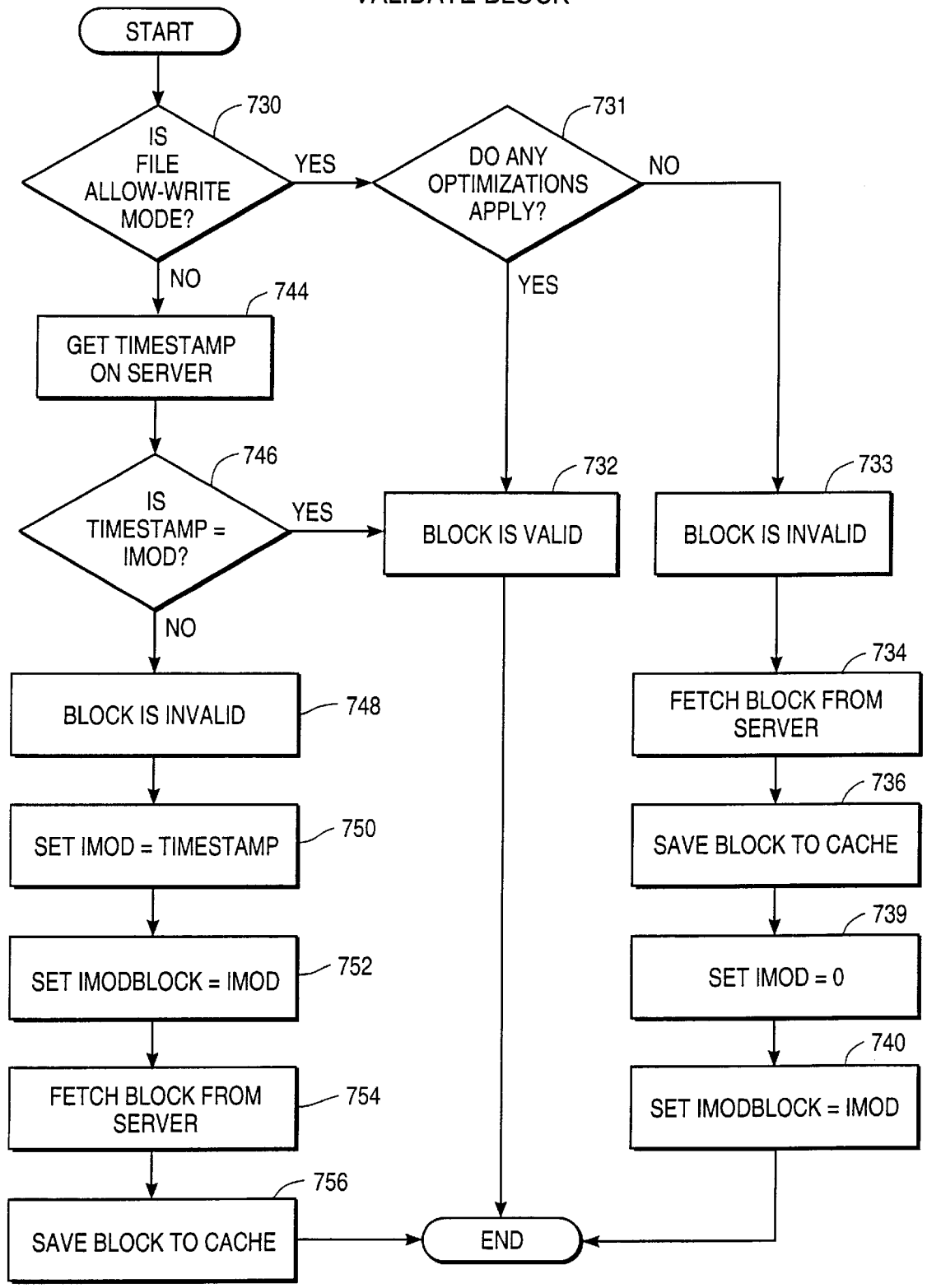
FIG. 10B illustrates a flowchart of validating a block of a cached file being read.

FIG. 10B illustrates a flowchart of validating a block of a cached file being read. At step 730, the file subsystem checks if the file was opened in allow-write mode. In allow-write mode, other computer systems in the distributed file system are allowed to write to the file.

At step 731, the cache subsystem determines if any of a number of optimizations apply that may be utilized to increase performance of the system. These optimizations will be discussed in more detail in reference to FIG. 10C. Although in a preferred embodiment, all of the optimizations are utilized, significant performance increases may be achieved with one or a few optimizations. Many of the optimizations performed by the present invention are based upon the S Principle which, in short, holds that the present invention is free to generate access patterns that could have occurred, and would be valid, without the invention.

The S Principle

The S Principle relies on the fact that cooperative distributed applications (entities) that work successfully without the present invention are designed to access the shared data storage correctly. For example, consider a banking application which updates customer account balance as a result of customer transaction. A properly designed distributed application ensures that two conflicting updates are not performed on the shared storage object at the same time. Otherwise, two cash withdrawals may incorrectly write to the shared storage simultaneously such that one withdrawal overwrites the other. Thus, the account would only be accredited one withdrawal to the account.

The S Principle states that if an access pattern to a shared storage object could have occurred without the use of the present invention, then if the invention presents such an access pattern to a distributed application instead of the access pattern which would have occurred without the invention, it is acceptable to do so. In other words, the present invention is free to generate access patterns that could have occurred, and would be valid, without the invention. Since the distributed applications which share storage are designed to handle all possible valid access patterns, they will correctly handle a valid access pattern presented to them by the invention.

The S Principle applies to distributed applications which meet following criteria:

The entities rely solely on the shared storage object, to communicate to each other, i.e., the entities solely use the shared storage object to exchange information with other entities (e.g., a mail application which stores messages for other mail applications on the file system), but do not use any other mechanism to exchange information with other entities (e.g., a mail application does not set up a separate socket connection to other mail applications and alert them about new messages, but instead writes some information to the shared storage object and other mail applications read the information stored in the storage mechanism to detect that new messages have arrived).

The entity does not rely on specific "timing" or "intervals" to detect events (e.g., a mail application might poll a specific file to see if new messages have arrived, but it does not expect that once a message header has been written to a shared storage object then the rest of the message will be written to the shared storage object within 5 seconds).

The shared storage object is reliable, i.e., the data written to a shared storage object is written to the shared storage object correctly every time.

For entities that meet these criteria (and many of the current distributed applications do), the following inventions exploit these criteria to reduce access and to shared storage objects and hence speed up the applications.

Most commercial distributed applications and environments meet the criteria required for S Principle for the following reasons:

Most distributed applications rely on the file system to communicate messages between client personal computers because most environments use a client-server paradigm instead of peer-to-peer paradigm.

Distributed applications usually can run on varying network infrastructures (e.g., from super fast FDDI/ATM networks to extremely slow 9,600 baud modems). For this reason, the applications cannot rely on specific timing.

Distributed applications usually can run on varying CPU speeds (e.g., from slow older generation Intel CPUs to super fast Pentium/RISC CPUs). For this reason, the applications cannot rely on specific timing.

Distributed applications usually can run with varying user populations (e.g., from few users in small workgroups to enterprise wide deployments with thousands of users). For this reason, the applications cannot rely on specific timing.

Data transferred between applications and shared storage objects employ protocols which use various techniques assure reliable transport and data storage, including checksums, acknowledgements, redundant storage.

In one embodiment, a 30 second interval or timer is utilized for determining if an access pattern to a shared storage object could have occurred without the use of the present invention. Thus, for example, a write operation may be deferred for up to 30 seconds but after that time, the write is flushed. Other time intervals may be utilized in other systems.

Returning to FIG. 10B, if the cache subsystem determines that an optimization may be applied to determine that a block is valid at step 731, the block is validated at step 732. The goal of the optimizations is to reduce the traffic between the client and server while still allowing entities on the client to access requested data. When the optimizations are applied, communication with the server is reduced or eliminated altogether.

If none of the optimizations apply, the block is invalid at step 733. Accordingly, the block is fetched from the server at step 734. After the block is fetched, the block is saved to the cache at step 736. At step 739, the cache subsystem sets the variable 1Mod to the zero. The variable 1ModBlock in the associated plain block of the FCI file is set equal to 1Mod at step 740. Zero is stored in 1Mod and 1ModBlock instead of the timestamp to indicate that the data in the block should not be trusted as the file is in allow-write mode.

If the file was opened in deny-write mode, meaning other computer systems are not allowed to write to the file, the cache subsystem retrieves the timestamp for the file on the server at step 744. At step 746, the timestamp is compared with 1Mod to determine if the cached block is valid (i.e., not stale). If the timestamp and 1Mod are equal, the cached block is valid at step 732.

If the timestamp and 1Mod are not equal, the cached block is invalid at step 748. First, 1Mod is set equal to the timestamp at step 750. At step 752, the variable 1ModBlock is set equal to 1Mod. The cache subsystem then fetches the block from the server at step 754. After the block is received by the cache subsystem, the block is saved to the cache at step 756.

If the cached file was opened in append mode, the present invention provides a further optimization by treating the file as if it was opened in non-share mode even if it was opened in share mode.

Figure 10C:
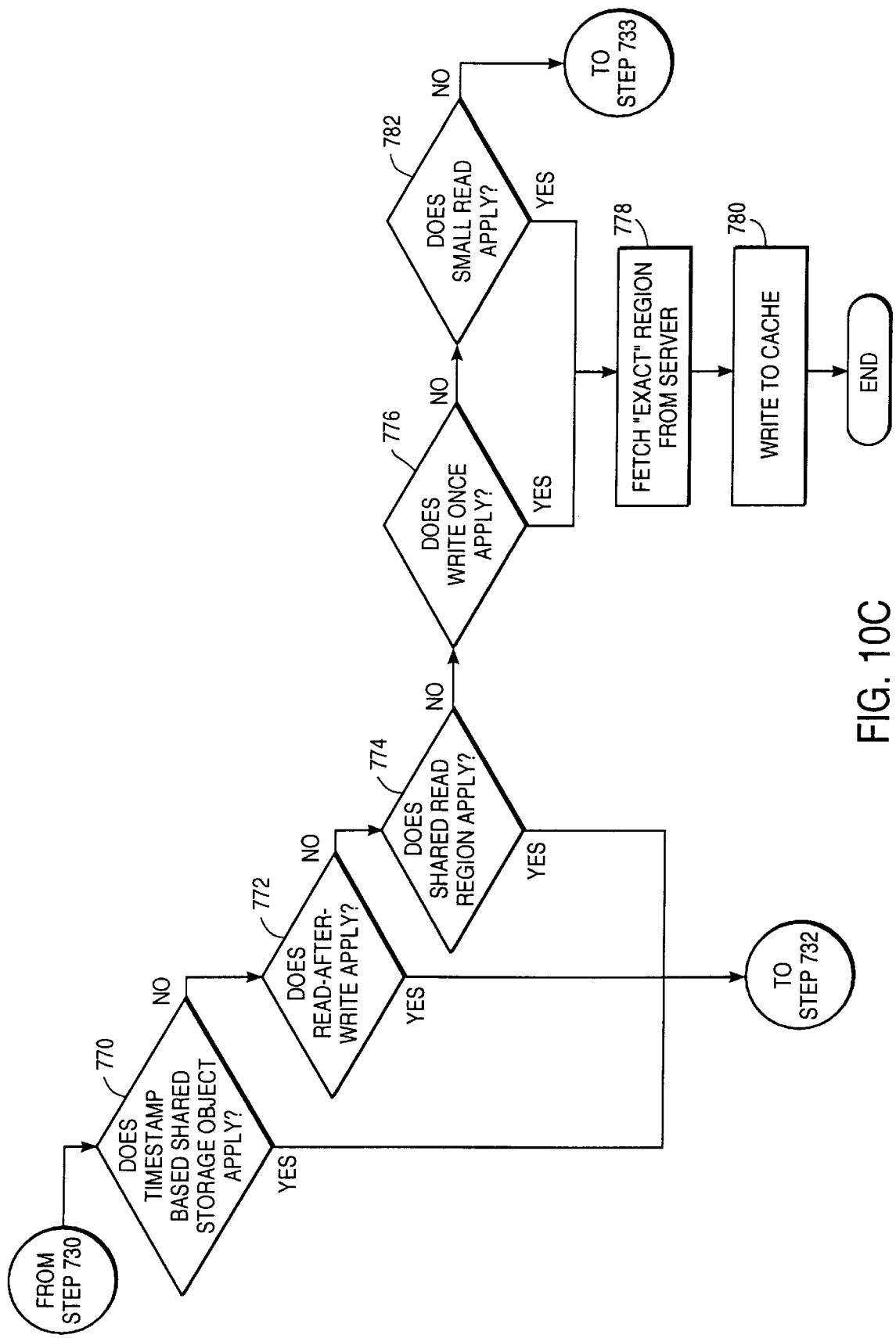
FIG. 10C illustrates optimizations that may be performed by the cache subsystem.

FIG. 10C illustrates optimizations that may be performed by the cache subsystem at step 731. At step 770, the cache subsystem determines if the timestamp based shared storage object optimization applies. This optimization applies to shared storage object access where a shared storage object is modified and an associated timestamp is also modified by a client prior to other clients accessing the shared storage object.

If an entity performs following sequence of operations on a shared storage object that is timestamp based:

Read (NamingInformation1, Range1) where the timestamp for the NamingInformation1 was TimeStamp1

Read (NamingInformation1, SubsetOfRange1) AND the timestamp for the NamingInformation1 is still TimeStamp1 Then, it is correct to return the cached region to the entity to satisfy the read request without performing any read or refresh operations on the shared storage object. This leads to better performance.

Given that for a shared storage object that is timestamp based, a timestamp is always changed before the changes in the shared storage object data are accessed by other entities. Thus, if the timestamp has not changed then the cached data has not changed. Hence it is correct to return cached data to the requesting entity.

Each read operation performed by the client on a shared storage object that is timestamp based is broken down into one or multiple blocks. A timestamp is maintained for each cached block (e.g., 1ModBlock). For each block, if the timestamp corresponding to the block equals timestamp for the NamingInformation, then cached data is returned to the requesting entity.

Otherwise, the cache subsystem determines if the read-after-write optimization applies at step 772. This optimization applies if an entity performs following sequence of file system operations:

Write (NamingInformation1, Range1)

Read (NamingInformation1, Range1)

Then it is correct to return the cached region to the entity to satisfy the read request without performing any read or refresh operations on the shared storage object. This leads to better performance.

The S Principle applies to this optimization. Even without the invention, it is possible that the distributed application could have been presented with the data being written by the Write operation when the following Read is performed. Hence it is correct to present the distributed application with the data written by the Write operation just preceding Read operation.

On every write operation requested by the entity, the following information is retained by the cache subsystem— the most recent NamingInformation and Range for a Write operation. Let us call these LastWriteNamingInformation and LastWriteRange, respectively.

At any time there is only one set of LastWriteNamingInformation and LastWriteRange. If another Write operation is requested by the entity then the LastWriteNamingInformation and LastWriteRange information for the previous write operation is overwritten. If, on the other hand, any operation other than Read is carried out then the LastWriteNamingInformation and LastWriteRange information is nullified.

For every Read operation requested by the entity, if the NamingInformation for the Read equals the LastWriteNamingInformation and Range for the Read is a subset of LastWriteRange, then following steps are carried out:

If the data written by the last Write operation is cached, it is flushed to the shared storage. (The rationale is that the application may be performing this access pattern to ensure that the data has been really written to the shared storage, so it is necessary to flush data written by last Write operation if cached. As shared storage is reliable, what data is stored in the cached region on the client is exactly the same as what is on the shared storage object after the Write.)

Data contained in the cached region is returned to the requesting entity without performing any reads or refreshes from the shared storage object.

Otherwise, the cache subsystem determines if the shared read region optimization applies at step 774. If an entity performs following sequence of operations:

Read1 (NamingInformation1, Range1)

Any noncontaminating file system operation

Read2 (NamingInformation1, SubsetOfRange1)

Then it is correct to return the cached region to the entity to satisfy the read request without performing any read or refresh operations on the shared storage object which leads to better performance.

Contaminating file system operations are defined to be those file system operations which communicate or transfer information from the shared storage object to the entity which executes the file system operation (e.g., a successful lock operation may communicate the information to the requesting entity on the client that it is acceptable to modify a portion of the shared storage object). If a file system operation transfers information solely from the entity to the shared storage object then it is a noncontaminating file system operation.

The S Principle applies to this optimization. Even without this invention, it is possible that the distributed application issuing Read2 could have been presented with the data read in the previous Read1 operation. This is because the entity has not performed any contaminating file system operations, thus, by definition, the entity have not received any new information from the shared storage object and hence other entities could not have communicated any changes in (NamingInformation1, Range1) to this entity. Accordingly, it is correct to present the distributed application with the data read by the Read1 file system operation in response to the Read2 file system operation.

For every successful read operation requested by the entity, the following information is retained by the cache subsystem—the most recent NamingInformation and Range for a Read operation. Let us call these LastReadNamingInformation and LastReadRange, respectively. At a time there is only one set of LastReadNamingInformation and LastReadRange.

For every read current file system operation requested by the entity, if the Read NamingInformation equals LastReadNamingInformation and ReadRange is a subset of LastReadRange, then data contained in the cached region is returned to the requesting entity without performing any reads or refreshes from the shared storage object. Else LastReadNamingInformation and LastReadRange information is overwritten with the new NamingInformation and Range from the read current file system operation.

Contaminating file system operations are those file system operations which "contaminate" the client with new information from the shared storage object. For Windows clients, those operations which are contaminating file system operation are those file system operations which "contaminate" the client with new information from the shared storage object. For Windows clients, those operations which are noncontaminating file system operations include "harmless" operations such as "cd" (Current Directory) and operations such as "setfatt" (Set File Attribute) which communicate information from the distributed application to file servers, but not from file servers to the distributed application.

If any contaminating file system operation is carried out then the LastReadNamingInformation and LastReadRange information is nullified.

Otherwise, the cache subsystem determines if the write once optimization applies at step 776. This optimization applies to shared storage object access where a storage object is only written once. Once the application has written to a specific DataRange of the file, the information in that DataRange does not change.

If an entity performs following sequence of operations on a shared storage object that is only written once:

Read (NamingInformation1, Range1)

Read (NamingInformation1, SubsetOfRange1)

Then it is correct to return the cached region to the entity to satisfy the read request without performing any read or refresh operations on the shared storage. This also leads to better performance.

For shared storage objects that are only written once, once data is written to the file, it is not changed. Hence it is correct to return cached data to the requesting entity. Each read operation performed by the client on a shared storage object that is only written once is broken down into one or multiple blocks. Each block is marked as a WriteOnceSharedStorageType block.

For each of these blocks, if the entity requests data from the cached blocks for the NamingInformation1, then the "exact" region is fetched from the server at step 778 and subsequently returned to the requesting entity. This data is then written to the cache at step 780.

Otherwise, the cache subsystem determines if the small read optimization applies at step 782. Depending upon the networking parameters used by entity to connect to the shared storage object (or to connect to the Refresh Agent which is described in a later section) such as latency, throughput, and the like, it may be faster to read small amount of data from the server than to attempt to refresh the data. If the small read optimization applies, then the "exact" region is fetched from the server at step 778 and subsequently returned to the requesting entity. This data is then written to the cache at step 780.

However, the entity may perform multiple small reads in a block of data. In that case it is faster to refresh a block of data than to read multiple small chunks of data. Therefore, small read accesses are tracked, and if frequent accesses are made to a block of data, the whole block is refreshed. Otherwise, small reads are satisfied by reading small requested amounts from the shared storage object. This leads to better performance.

The entity may transfer a fixed amount of data to the server to attempt to refresh the data (see, e.g., the Refresh Agent). If the entity's read request entails the transfer of less data, it is more efficient to make the request directly without the involvement of a Refresh Agent. However, if the entity will make a string of consecutive read requests, a single read refresh is more effective than multiple read requests.

In one embodiment, a small read is defined to be less than 0×90 (hexadecimal) bytes for the bandwidth and latency of a 14.4 Kbps modem with 0.200 ms round trip delay. If a read operation performed by the client is smaller than 0×90 bytes and if a previous small read operation also occurred in the same block, then the whole block is refreshed as frequent accesses to this block are likely. Else the small read is satisfied from the shared storage object. The data read from the shared storage object is also written into the cache.

Although the embodiment described relies on likely consecutive read accesses to a region, this method may be changed in different environments. Thus, the invention is not limited to this implementation described.

Otherwise, if none of these optimizations apply, the block of data in the cache is invalid so it will be read in from the shared storage object, stored in the cache, and is returned to the requesting entity. The block is marked with the current timestamp of the NamingInformation (see steps 733–740 in FIG. 10B).

Figure 11:
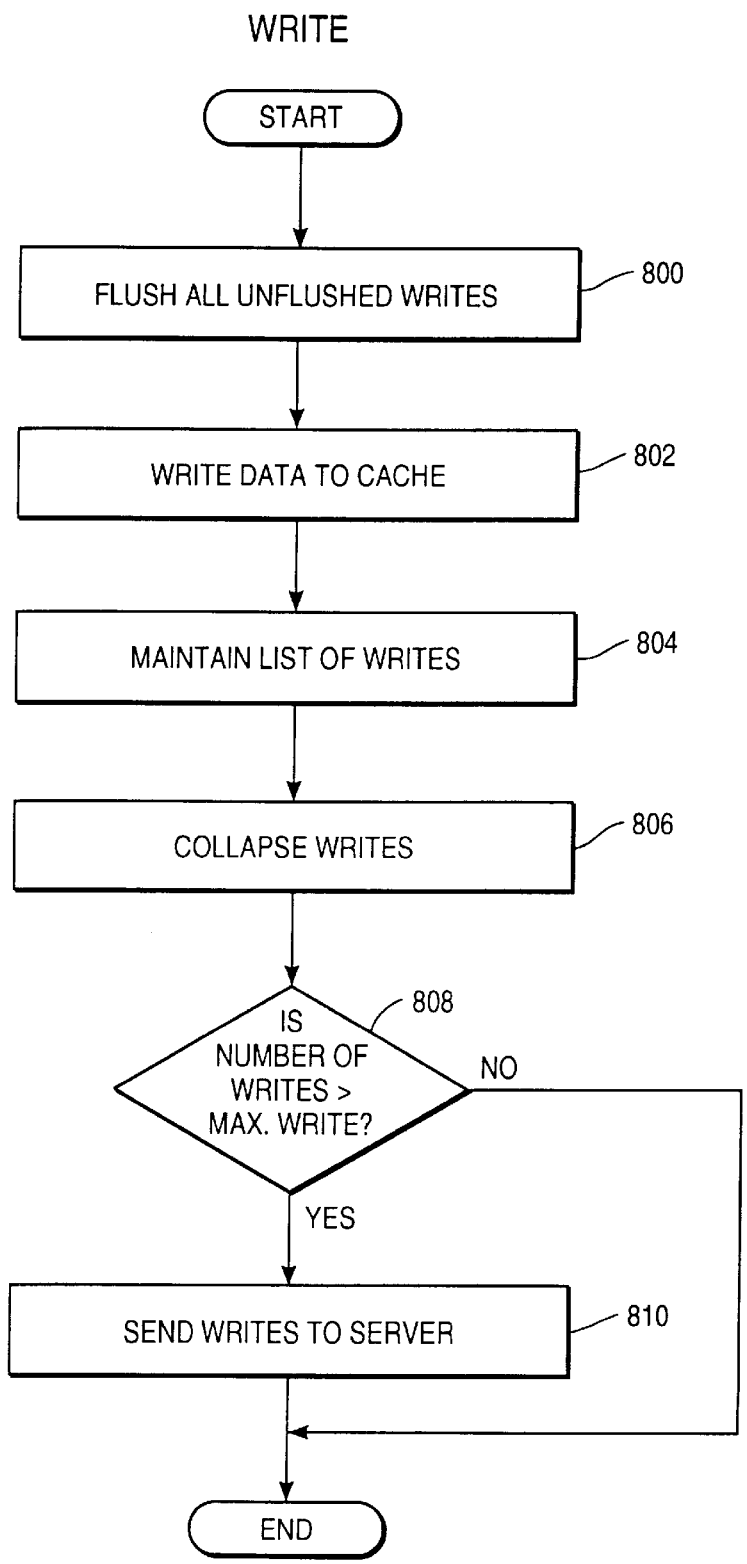
FIG. 11 illustrates a flowchart of a file system call that writes date to a block of a cached file.

FIG. 11 illustrates a flowchart of a file system call that writes data to a block of a cached file. At step 800, the cache subsystem flushes all unflushed writes for other files to the file server. This is done to preserve the ordering of writes to shared files. The data is written to the cache at step 802.

Each write to the shared storage object requires a round trip. When writes can be combined, these round trips may be reduced or avoided. Given the following sequence of operations:

Write (NamingInformation1, WriteRange1)

No contaminating file system operations

Write2 (NamingInformation1, WriteRange2) AND WriteRange1 overlaps WriteRange2 Then Write1 and Write2 can be combined, leading to better performance. By overlap, it is meant that the ranges may specify memory in common or one range may begin right after the other range ends.

The S Principle applies to this optimization. Even without this invention it is possible that a distributed application could have been presented the writes to the server with the deferred write timing. Hence, it is correct to defer the write operation while the intervening operations are not contaminating file system operations.

As stated earlier, contaminating file system operations are those operations where information flows from the server to the client (e.g., a Lock operations). In contrast, a noncontaminating file system operation is an operation where information flows from the client to the server (e.g., a Write operation).

When a Write is requested, the cache subsystem records the (WriteNamingInformation, WriteRange, WriteData). As long as the entity does not request any contaminating file system operations, Write1 is deferred for N operations. After N operations, the deferred Write1 is executed. If another write, Write2, takes place while the Write1 is deferred, there are three possibilities which are handled as follows:

Write1 has different WriteNamingInformation than Write2. In this case, Write1 is executed and the Write2 is deferred. The Write2 (WriteNamingInformation, WriteRange, WriteData) is recorded.

WriteNamingInformation of Write1 and Write 2 are the same BUT the WriteRanges of Write1 and Write2 do not overlap. This is treated the same the preceding case.

WriteNamingInformation of Write1 and Write2 are the same AND the WriteRanges Write1 and Write2 overlap. In this case, the WriteRange is updated to record the combined ranges of Write1 and Write2. The data is similarly updated to have the combined WriteData. As one can appreciate, one round trip to the server associated with writing this data is avoided which increases performance.

In order to provide this optimization, the cache subsystem maintains a list of writes at step 804. When data is written to the cache, the cache subsystem stores the exact byte(s)

written to in a linked list entry for each write. The linked list entry contains the starting offset within the file and the length of the region written. If two writes are to contiguous regions of the file, the writes are collapsed into a single contiguous write at step 806 as described above.

Max_Write is a user defined variable that indicates how many writes may be stored in the linked list before they are written out to the file on the server. At step 808, the number of writes in the linked list is compared to Max_Write. If the number of writes in the linked list is greater than Max_Write, the cache subsystem writes the writes back to the server using the information stored in the linked list.

Figure 12:
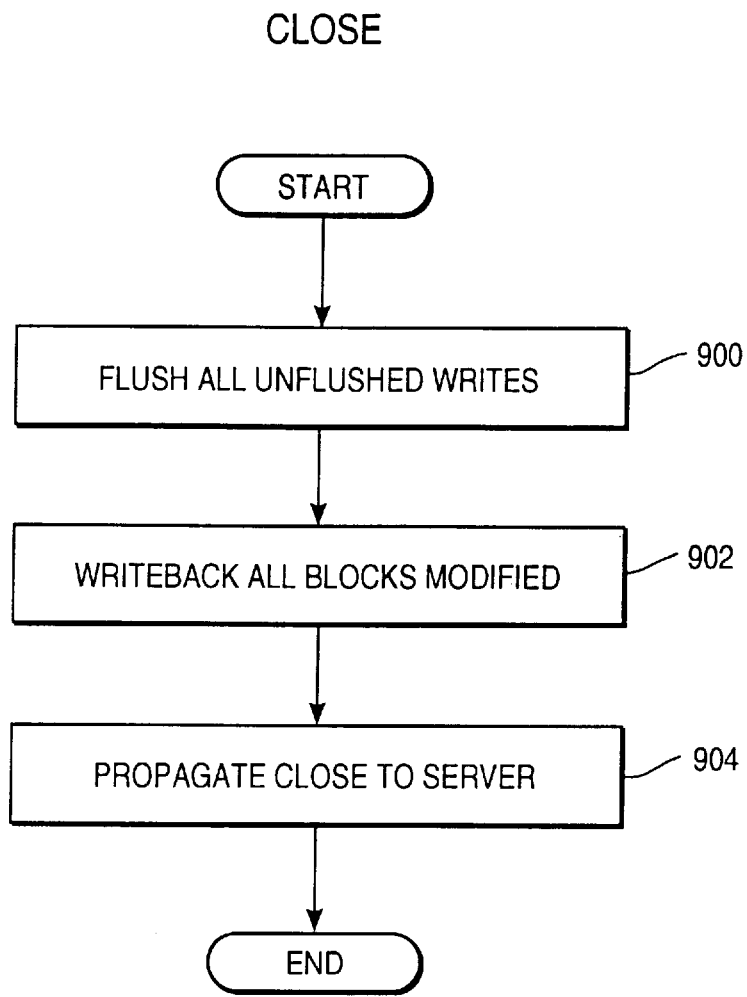
FIG. 12 illustrates a flowchart of a file system call that closes a cached file.

FIG. 12 illustrates a flowchart of a file system call that closes a cached file. At step 900, the cache subsystem flushes all unflushed writes to shared files. This is done to preserve the ordering of writes to shared files. The cache subsystem writes back all file blocks modified since the file was last opened at step 902. The cache subsystem then propagates the close request to the server at step 904.

Figure 13:
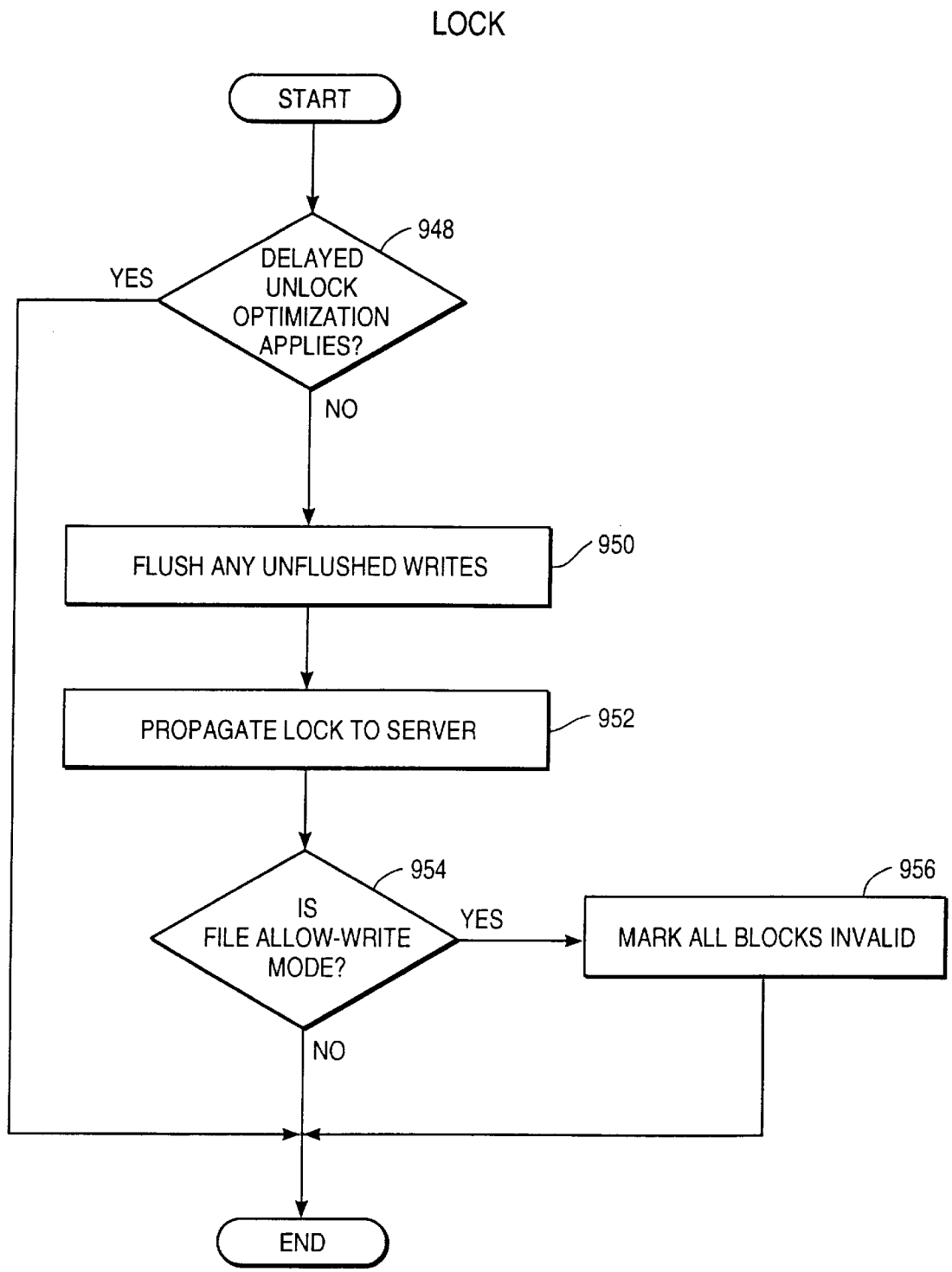
FIG. 13 illustrates a flowchart of a file system call that locks a cached block.

FIG. 13 illustrates a flowchart of a file system call that locks a cached block. At step 948, the cache subsystem determines if a delayed unlock optimization applies. Some applications unlock and quickly lock again. In this case, the S Principle allows the invention to delay the unlock so that the unlock and quickly following lock may be discarded if there is no intervening unlock contaminating operation.

When an entity requests to unlock a shared storage object, the cache subsystem returns success to the calling entity, but does not unlock the shared storage object resource. If the lock on the same shared storage object resource is received before N other operations and no intervening operation is unlock contaminating to the lock request, the cache subsystem also returns success to the calling entity. However, the lock is not passed to the shared storage object.

Each lock and unlock request delays the requesting entity for the time requires for a full round trip latency across the network. By alleviating these round trips, performance is increased.

The S principle applies to this optimization. Even without this invention, it is possible that the distributed application could unlock the shared storage object resource and relock the same shared storage object resource before any other distributed application had the opportunity to acquire the lock.

When an entity requests an unlock, the cache subsystem remembers the shared storage object resource to be unlocked in a pending unlock table. After N other operations, the unlock in the pending unlock table is executed. If the entity requests a lock in the shared storage object resource in the pending unlock table, the lock request is ignored (as the shared storage object resource is already locked), and the pending unLock table is cleared.

If an unlock contaminating operation is encountered while the pending unlock table is not clear, the unlock in the pending unlock table is executed prior to the unLock contaminating operation. Unlock contaminating operations may include any unlock operation, a lock on any shared storage object except the one recorded in the pending unlock table, and any other operation which is not a qualified noncontaminating file system operation.

If the delayed unlock optimization does not apply, the cache subsystem flushes all unflushed writes to the block at step 950. The cache subsystem then propagates the lock request to the server at step 952. Preferably, the lock request specifies the region requested so that the entire block is not locked. At step 954, the cache subsystem determines if the file was opened in allow-write mode. If it was, the system marks all cached blocks for the file as invalid at step 956.

Figure 14:
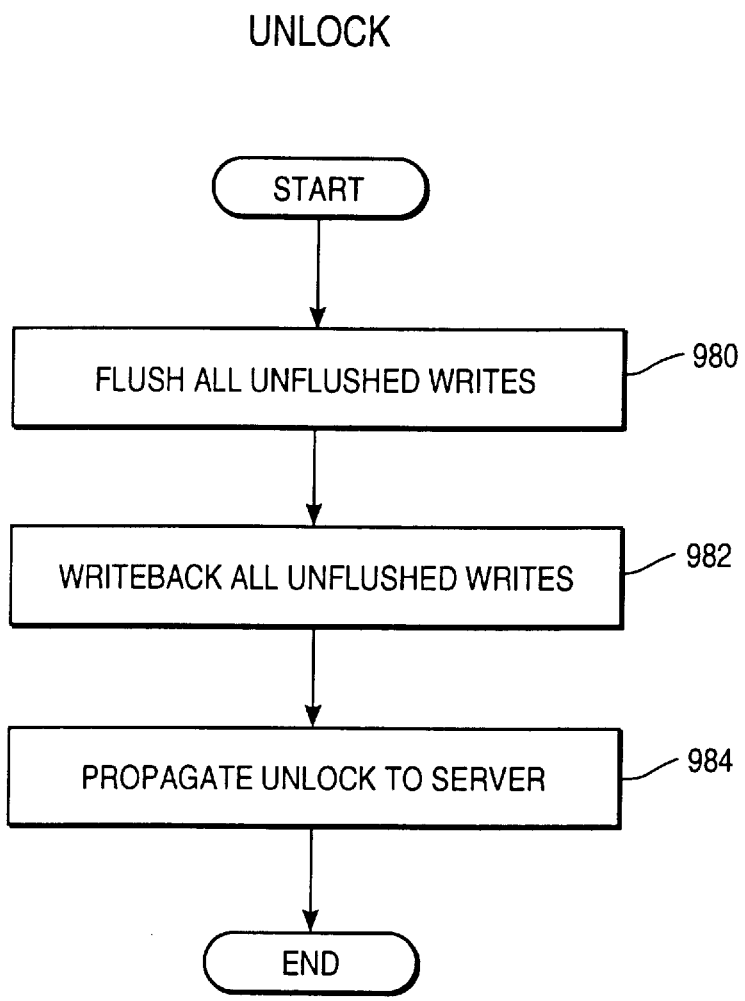
FIG. 14 illustrates a flowchart of a file system call that unlocks a cached block.

FIG. 14 illustrates a flowchart of a file system call that unlocks a cached block. At step 980, the cache subsystem flushes all unflushed writes to shared files. At step 982, all unflushed writes since the last lock to the server are written back. The cache subsystem then propagates the unlock request to the server at step 984.

In general, other file system calls are propagated on to the server since the other file system calls are generally infrequent. However, the description of specific file system calls is for illustration. Other file system calls may also be optimized.

The present invention may be implemented in many forms. In a simple form, the software is only installed on the client computer side. Once installed, file access is increased due to the file caching and data remains intact due to the cache coherency protocols. Additionally, components of the present invention may run on both the server and client sides of the distributed file system. Installation of software on the server side allows for increased performance because of more efficient use of the low bandwidth link and block validation techniques. In any event, the operation system does not have to be modified to achieve a substantial immediate performance increase for the distributed file system.

Refresh Agent

In a preferred embodiment, the present invention is installed on the server side of the network. The software installed on the server side creates a Refresh Agent (also called a proxy-server) which acts on the client's behalf on the server. Take as an example the remote access shown in FIG. 5. Client computer 250 is required to send file and non-file system calls to the server over the relatively low bandwidth link. However, if the Refresh Agent of the present invention is installed on the server, the accelerator subsystem of the present invention on the client computer can make more efficient use of the low bandwidth link.

The accelerator subsystem is able to utilize techniques like compression and differential compression because the Refresh Agent will receive the signals and then issue the file or non-system calls on behalf of the accelerator subsystem. This technique provides dramatically increased performance on the server because all system calls, both file and non-file system calls, are accelerated by a protocol that is considerably faster than standard TCP/IP or SPX/IPX. Although the Refresh Agent may be installed on the server, it may also be installed on any computer system on the network. The Refresh Agent is also able to enhance the performance of validating blocks.

Figure 15A:
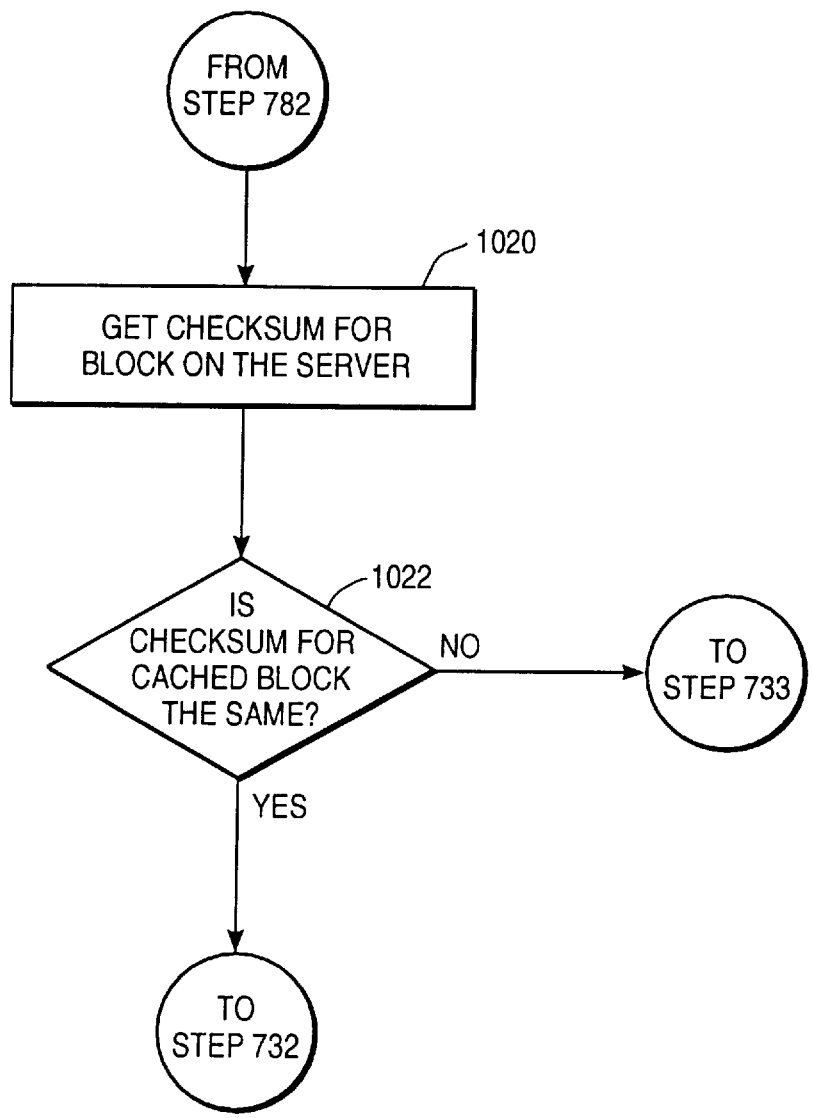
FIG. 15A illustrates a flowchart of validating blocks using a Refresh Agent.

FIG. 15A illustrates a flowchart of validating blocks using a Refresh Agent. The Refresh Agent maintains a checksum for the blocks on the server. After the cache subsystem on the client has not been able to apply one of the optimizations in FIG. 10C, the cache subsystem requests the checksum for the block from the Refresh Agent on the server at step 1020.

At step 1022, the cache subsystem compares the received checksum to a checksum it has calculated for the block in the cache. If the checksums are the same, the block in the cache is valid. Otherwise, block is invalid.

Figure 15B:
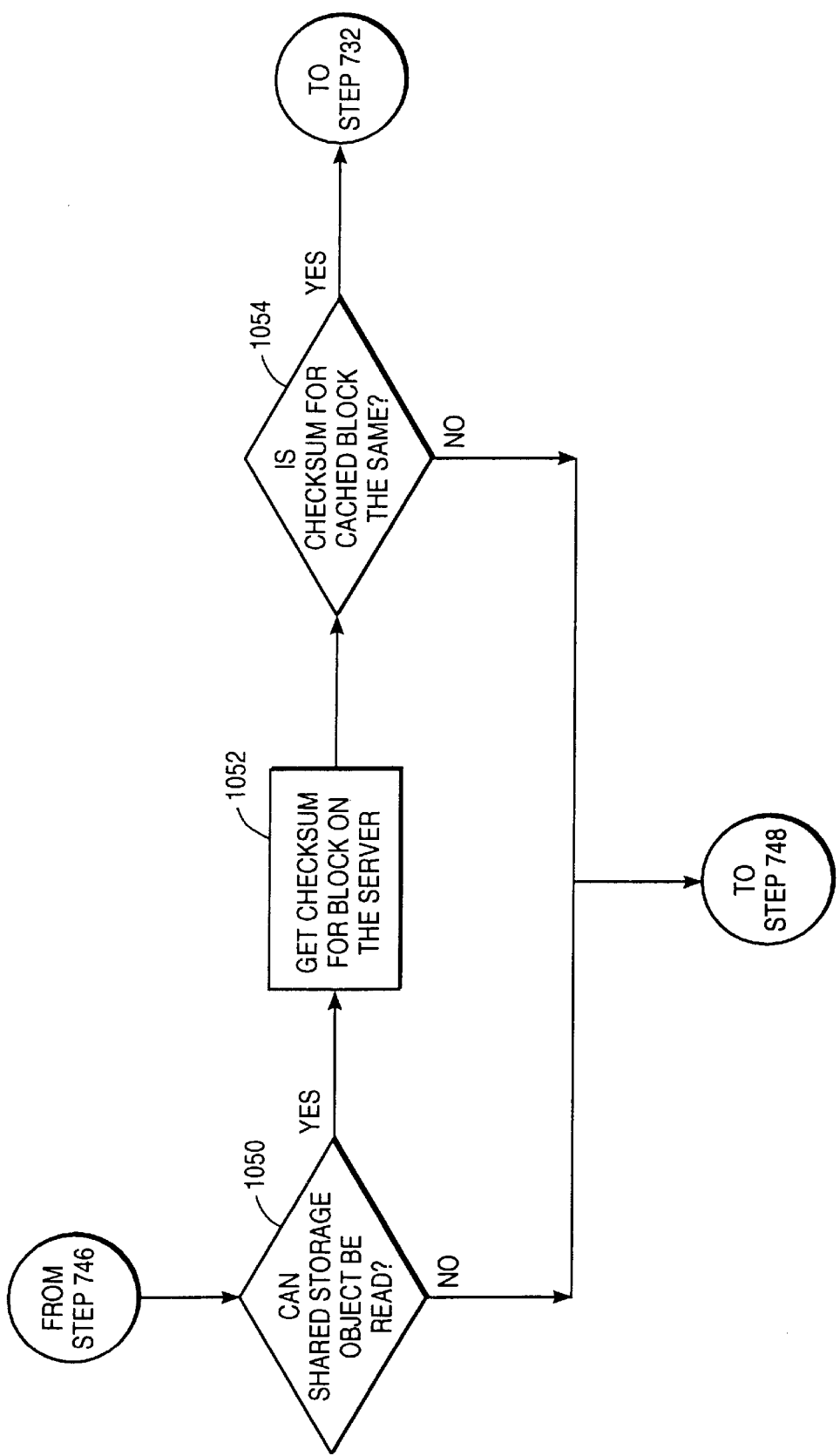
FIG. 15B illustrates another flowchart of validating blocks using the Refresh Agent.

The Refresh Agent may perform another optimization as shown in FIG. 15B which illustrates another flowchart of validating blocks. After the cache subsystem has determined that the file is not allow-write mode and that the timestamp on the server is not the same as the variable 1Mod for the file in the cache, FIG. 10B shows the cache subsystem retrieving the block from the server.

However, the cache subsystem can determine whether the shared storage object may be read on the server at step 1050.

Types of shared storage object accesses which prevent other entities from writing to that part of storage, still allow other entities to read from that part of shared storage. For example, in the DOS/Windows environment, if an application opens a file in shared deny-write mode, then no other clients can write to that file while this client has this file open. Other clients, however, can read this file. Thus, the Refresh Agent can also read this file. Hence, the Refresh Agent may be utilized to detect if a block of information has changed and not read the block even if a timestamp change is detected.

If the shared storage object can be read on the server, the cache subsystem requests the checksum for the block from the Refresh Agent on the server at step 1052.

At step 1054, the cache subsystem compares the received checksum to a checksum it has calculated for the block in the cache. If the checksums are the same, the block in the cache is valid even though the timestamp has indicated that the file has changed. Otherwise, block is invalid.

In a preferred embodiment, the cache subsystem prepares a checksum for the block or region to be validated. The cache subsystem then sends the checksum to the Refresh Agent. The Refresh Agent prepares a checksum for the specified block or region and compares the checksums. If the checksums are identical, the block in the cache is valid and the Refresh Agent sends a message to that effect to the cache subsystem. Otherwise, the Refresh Agent indicates to the cache subsystem that the checksums do not match and the cache subsystem fetches the block or region from the file server.

The previously described refresh mechanism generally requires the Refresh Agent to have shared storage object permissions sufficient to access data for all entities which use the Refresh Agent. In some distributed systems, this is a barrier to the deployment of the invention. However, the following describes how this barrier may be removed.

The Refresh Agent may be embedded in the communication server. The communications server enables the Refresh Agent to share the communication sessions already established between the entity and the shared storage object. By using the existing communications session, the Refresh Agent does not require additional permissions. When the Refresh Agent uses the existing communications sessions, the Refresh Agent does not need to establish a communications sessions, nor does it need to independently open the file to access the RegionNamingInformation and RegionRange. This leads to better performance.

Given that the entity requests data from a region specified by RegionNamingInformation and RegionRange, even without this invention the entity will already have established a communications session and opened the file corresponding to the RegionNamingInformation and RegionRange. The Refresh Agent can piggyback the refresh operation without additional overhead.

When an entity attempts to read a region of data from the shared storage object and the region has been already cached and no other optimizations apply, the cache must be validated before the cached data can be returned to the entity. This validation is achieved by performing following steps:

Client sends a checksum of the cached region and the RegionNamingInformation, RegionRange to the Refresh Agent.

Refresh Agent reads the region from shared storage object using the RegionNamingInformation, RegionRange provided by the client using the communications session and open file already established by the entity.

Refresh Agent computes checksum on the read region.

If the checksum sent by the client equals checksum computed by Refresh Agent, then the cached region is still valid. Refresh Agent sends back "valid" message to client. Else the cached region is not valid, Refresh Agent sends the data back to the client.

If client receives "valid" message back from Refresh Agent, then the cache subsystem returns the cached region to the requesting entity. Else the client receives the data from the shared storage object region and returns this data to the requesting entity. The client also enters the data in the cache.

The Refresh Agent may also be utilized for other types of optimizations. In small write consolidation, the Refresh Agent will be consolidate small writes. Given the following sequence of operations:

Write1 (NamingInformation1, WriteRange1)

No contaminating file system operations

Write2 (NamingInformation1, WriteRange2) AND Write Range1 plus WriteRange2 does not exceed MaxBytes Then Write1 and Write2 may be combined leading to better performance.

The S Principle applies to this optimization. Even without this invention it is possible that a distributed application could have been presented with the deferred write timing. Hence, it is correct to defer the write operation while the intervening operations are not contaminating file system operations.

When Write1 is requested, the cache subsystem records the WriteNamingInformation, WriteRange, and WriteData. As long as the entity does not request any contaminating file system operations, Write1 is deferred for N operations. After N operations, the deferred Write1 is executed.

If another write, Write2, takes place while the Write1 is deferred, there are four possibilities as follows:

Write2 has different WriteNamingInformation. In this case, Write1 is executed and the Write2 is the new deferred Write1. The WriteNamingInformation, WriteRange, and WriteData for Write2 is recorded.

WriteNamingInformation1 of Write1 is the same as WriteNamingInformation2 of Write2 BUT WriteRange1 of Write1 does not overlap WriteRange2 of Write2 AND total WriteData for Write1 and Write2 is more than MaxBytes. This is treated the same as above.

WriteNamingInformation1 of Write1 is the same as WriteNamingInformation2 of Write2 BUT WriteRange1 of Write1 does not overlap WriteRange2 of Write2 AND total WriteData for Write1 and Write2 is less than MaxBytes. The cache subsystem records the WriteRange and WriteData for both Write1 and Write2. When the cache subsystem decides to flush the deferred writes, they are packaged into a single packet and sent to the Refresh Agent. The Refresh Agent does the write over its fast link to the shared storage object.

WriteNamingInformation1 of Write1 and WriteNamingInformation2 of Write2 are the same AND WriteRange1 of Write1 overlaps WriteRange2 of Write2. In this case, the recorded WriteRange is updated to record the combined ranges of the Write1 and Write2. The data is similarly updated to have the combined WriteData.

As can be seen, the last two cases above save one round trip to the server for writing data. Thus, performance is increased for many writes.

Installing the Refresh Agent of the present invention on the server side can also provide increased performance for non-file system calls. For example, the Refresh Agent may be used to validate SQL database operations. Assume that the user of the client computer has requested an SQL data operation that has already been performed and is currently in the cache on the client computer. However, the cache subsystem does not know if the database has changed since the last database operation was performed. The cache subsystem then generates a series of checksums for the results of the database operation in the cache and sends it to the Refresh Agent on the server side.

The Refresh Agent performs the database operation, generates a series of checksums for the results of the database operation, and compares the series of checksums. If the checksums indicate that the results are the same, the Refresh Agent is able to just send a signal to the cache subsystem on the client computer indicating that the results in the cache are still valid. Thus, the results of the database operation do not have to be sent over the network link again.

Other Optimizations

The cache subsystem often has the option of several equally correct methods to satisfy the entity's request. In small read optimization, the client can issue a refresh request or read the data directly from the shared storage object. The best performance requires the client to determine the entity's future behavior. This is done by pattern matching and leads to better performance.

Given two equally correct alternatives, the cache subsystem is free to select the alternative which delivers the best performance. If the entity requests data to be read specified by NamingInformation1 and RangeInformation1 starting at the beginning (0 offset) of a storage object with a length of over 1K bytes AND immediately follows with another read specified by NamingInformation1 and RangeInformation2. Additionally, RangeInformation1 has the same size as RangeInformation2 AND RangeInformation2 has an offset directly following RangeInformation1. If these conditions are met, the cache subsystem assumes that the entity is doing a file copy and the cache subsystem prefetches the largest possible blocks or refreshes the largest possible blocks.

Another optimization allows the cache subsystem to have different sized blocks in the cache depending on the characteristics of the files in the cache (i.e., dynamic block sizes). This invention applies to shared storage object types where block size access patterns are well known. Some files (e.g., .exe, non-shared, timestamp) will get better performance with large block sizes, other files (shared databases) need smaller block sizes. If an entity opens a file with NamingInformation that specifies a known block size, then the cache subsystem sets the cache block size to the value associated with the specific known block size which leads to better performance.

If the cache subsystem chooses a block size which is smaller than the block size access pattern behavior, the cache subsystem will perform more prefetches and refreshes than required. In this case, increasing the block size improves performance.

If the client chooses a block size which larger than the block size access pattern behavior, the client will prefetch and refresh more data than required. In this case, decreasing the block size improves performance.

When the entity does a file open file system operation for a shared storage object with a known block size, the cache subsystem configures the cache to use the known block size for all data caching for that file.

Normally when an entity reads one block from a shared storage object, any other blocks in the shared storage object must be refreshed as the recently read block could reference the other cached blocks which are now stale. Thus, a file read operation is a contaminating file system operation.

This invention applies to shared storage object access where file read does not need to be considered as a contaminating file system operation. These shared storage objects (or nonreferencing objects) do not reference other information in the shared storage object. Nonreferencing objects include flat text files and simple record-based files. If a requesting entity requests to open a file with NamingInformation that specifies a nonreferencing object, then the cache subsystem does not treat the read as a contaminating file system operation. This leads to better performance.

By definition, if the entity reads from a shared storage object that is a nonreferencing object, it cannot receive any information about changes to any shared storage object. The S Principle continues to apply, even after a read from a shared storage object that is a nonreferencing object. Accordingly, for each read file system operation, if the shared storage object accessed is a nonreferencing object, the operation is not treated as a contaminating file system operation.

An optimization is provided for directory and file attribute requests. If an entity performs one of the following operations:

Directory (DirectoryNamingInformation, FileFilterSpecfication)

Get Attributes (DirectoryNamingInformation, FileName)

Then when the cache contains information for DirectoryNamingInformation and FileFilterSpecification or FileName, it is correct for the cache subsystem to return cached information after the Refresh Agent returns a "valid" message, otherwise, the cache subsystem requests the information from the shared storage object. As the information is not always requested from the server, performance is increased.

The directory entries in the cache are compared to the actual values on the shared storage object. If the values match, the cache is correct. This process may be implemented in two ways which will be called quick directory refresh and complete directory refresh, respectively.

In quick directory refresh, the cache subsystem sends the file names/patterns (e.g., "*.exe") of all entries that are cached and a checksum to the Refresh Agent. If the Refresh Agent detects that one of the files specified by the cache subsystem is no longer in the directory, the Refresh Agent sends back an "invalid" message. Otherwise, the Refresh Agent computes a checksum for the directory information for the specified file names/patterns. If the checksums are the same, then the Refresh Agent sends back a "valid" message. The cache subsystem can typically afford to do a quick directory refresh more frequently as it is likely to succeed more often.

In complete directory refresh, the cache subsystem sends a checksum for all entries in a directory that are cached to the Refresh Agent. The Refresh Agent computes a checksum for the entries in the directory on the server. If the checksums are the same, then the Refresh Agent sends back a "valid" message. Otherwise, the Refresh Agent sends back an "invalid" message. If permissions of the client and Refresh Agent are different, an "invalid" message may occur frequently. However, if the Refresh Agent is embedded in the communication server as described earlier, the permissions for the client and Refresh Agent are identical and hence the complete directory refresh does not have this problem. Other ways of solving this problem may be utilized including not performing a checksum on the permissions.

The quick and complete directory refresh mechanisms may be performed as follows:

Cache subsystem calculates a checksum on all filenames and attributes contained in the cache which match (DirectoryNamingInformation, FileFilterSpecification or FileName).

Cache subsystem sends checksum and (DirectoryNamingInformation, FileFilterSpecification or FileName) to the Refresh Agent.

Refresh Agent accesses the filenames and attributes corresponding to (DirectoryNamingInformation, FileFilterSpecification or FileName) from the shared storage object.

Refresh Agent computes the checksum on all filenames and attributes.

If the checksum sent by the cache subsystem equals the checksum computed by the Refresh Agent, the cached information is still valid. The Refresh Agent sends back "valid" message to cache subsystem on the client. Else the cached information is not valid and the Refresh Agent sends back "invalid" message to client.

If the cache subsystem receives "valid" message back from Refresh Agent, it returns the cached information to the requesting entity, otherwise, the cache subsystem reads the information specified by the DirectoryNamingInformation, FileFilterSpecification or FileName, from the shared storage object and returns this information to the requesting entity. This information is also placed in the cache.

Any difference in the permissions between the cache subsystem and the Refresh Agent could cause this optimization to fail when the cache information is correct. Thus, it may be preferable for the permissions to be the same or to not compare the permissions. The request following the invalid message should be originated by cache subsystem.

The invention has now been described in terms of a preferred embodiment. Modification and substitutions will now be apparent to persons of ordinary skill in the art. Accordingly, it is not intended that the invention be limited except as provided by the appended claims.

What is claimed is:

1. In a computer network providing a distributed storage system, the computer network including a server computer and a client computer where objects stored on the server computer are accessible by the client computer via a network link, a method of enhancing performance of the client computer comprising the steps of:

an application on the client computer issuing a system call to be sent to the server computer over the network link;

a cache subsystem on the client computer intercepting the system call on the client computer before the system call is sent over the network link, the cache subsystem being separate from an operating system of the client computer;

the cache subsystem analyzing past system calls in order to determine if the system call is capable of being serviced locally by utilizing a cache on the client computer;

servicing the system call on the client computer if the system call is serviceable locally; and sending the system call to the server computer if the system call is not serviceable locally.

2. The method of claim 1, wherein the analyzing step includes determining a plurality of optimizations.

3. The method of claim 2, wherein an optimization includes the step of deferring system calls that specify a write so that writes may be combined.

4. The method of claim 3, wherein the step of deferring includes:

maintaining a list of system calls that specify a write of data;

if at least two system calls specify overlapping regions, combining the at least two writes; and otherwise, sending the system calls after a predetermined time.

5. The method of claim 2, wherein an optimization includes if a system call specifying a write of data to a location is followed by a system call specifying a read of at least a portion of the data that was written, then the read is capable of being serviced locally.

6. The method of claim 2, wherein an optimization includes if a system call specifying a first read of data at a location is followed by a system call specifying a second read of at least a portion of the data that was read in the first read without any intervening contaminating file system calls, then the second read is capable of being serviced locally.

7. The method of claim 2, wherein an optimization includes if a system call specifying a first read of data at a location in a timestamp based file is followed by a system call specifying a second read of at least a portion of the data that was read in the first read and the timestamps associated with the timestamp based file is the same for both the first and second reads, then the second read is capable of being serviced locally.

8. The method of claim 2, wherein an optimization includes if a system call specifying a first file open of a file is followed by a system call specifying a second file open of the file without any intervening file system calls that close the file, then the second open is capable of being serviced locally by using a same handle.

9. The method of claim 2, wherein an optimization includes if a system call specifying a read of data less than a predetermined amount, the system call is sent to the server computer.

10. The method of claim 1, further comprising the step of validating data in the cache on the client computer including the steps of:

generating a first checksum for the data in the cache on the client computer;

sending the first checksum to a refresh agent on the server computer over the network link;

the refresh agent generating a second checksum for corresponding data on the server computer, the refresh agent being separate from an operating system of the server computer;

and comparing the first and second checksums.

11. The method of claim 10, further comprising the step of sending a signal to the client computer indicating the data in the cache is valid if the first and second checksums are equal.

12. The method of claim 1, wherein the system call requests directory information.

13. The method of claim 10, wherein the step of validating is not performed if the system call specifies a read of a small amount of data so that the system call may be sent to the server.

14. The method of claim 1, wherein the intercepting step is performed by setting up a shadow drive.

15. The method of claim 1, wherein the system call is a file system call or non-file system call and wherein the analyzing step is further based on a type of the system call.

16. The method of claim 1, wherein the system call is a database call or a network application programming interfaces call.

17. In a computer network providing a distributed storage system, the computer network including a server computer and a client computer where objects stored on the server computer are accessible by the client computer via a network link, a method of enhancing performance on the client computer comprising the steps of:

an application on the client computer issuing a system call to be sent to the server computer over the network link;

a cache subsystem on the client computer intercepting the system call on the client computer before the system call is sent over the network link, the cache subsystem being separate from an operating system of the client computer;

the cache subsystem determining if the system call is capable of being serviced locally utilizing a cache on the client computer;

servicing the system call on the client computer if the system call is serviceable locally, the servicing step including validating data in the cache on the client computer by generating a first checksum for the data in the cache on the client computer, sending the first checksum to a refresh agent on the server computer over the network link, the refresh agent generating a second checksum for corresponding data on the server computer, and comparing the first and second checksums; and sending the system call to the server computer if the system call is not serviceable locally.

18. The method of claim 17, further comprising the step of sending a signal to the client computer indicating the data in the cache is valid if the first and second checksums are equal.

19. The method of claim 17, wherein the system call requests directory information.

20. The method of claim 17, wherein the step of validating is not performed if the system call specifies a read of a small amount of data so that the system call may be sent to the server computer.

21. The method of claim 17, wherein the system call is a file system call or non-file system call and wherein the determining step is further based on a type of the system call.

22. The method of claim 17, wherein the system call is one of a database call and a network application programming interfaces call.

23. In a computer network providing a distributed file system, the computer network including a server computer and a client computer where files stored on the server computer are accessible by the client computer via a network link, a method of providing caching on the client computer comprising the steps of:

installing a storage system on the client computer;

a cache subsystem maintaining a cache on the client computer for selected files, the cache subsystem being separate from an operating system of the client computer;

the cache subsystem intercepting a file system call specifying a read operation of a selected file;

installing a refresh agent on the server computer, the refresh agent being separate from an operating system of the server computer;

the refresh agent indicating to the cache subsystem whether data in the cache is valid;

if the file system call requests data in the cache and the data is valid, accessing the data in the cache; and if the file system call requests data in the cache but the data is invalid, sending the file system call to the server computer over the network link.

24. The method of claim 23, further comprising the step of validating data in the cache comprising the steps of:

the cache subsystem generating a first checksum for the data in the cache on the client computer;

the cache subsystem sending the first checksum to the refresh agent on the server computer over the network link;

the refresh agent generating a second checksum for corresponding data on the server computer; and comparing the first and second checksums.

25. The method of claim 23, further comprising the step of sending a signal to the client computer indicating the data in the cache is valid if the first and second checksums are equal.

26. In a computer network providing a distributed storage system, the computer network including a server computer and a client computer where objects stored on the server computer are accessible by the client computer via a network link, a computer program product for enhancing performance of the client computer comprising:

code for intercepting a system call issued by an application on the client computer before the system call is sent to the server over the network link;

code for analyzing current and past system calls in order to determine if the system call is capable of being serviced locally by utilizing a cache on the client computer;

code for servicing the system call on the client computer if the system call is serviceable locally;

code for sending the system call to the server computer if the system call is not serviceable locally; and a computer-readable medium for storing the codes;

wherein the code resides on the client computer and is separate from an operating system of the client computer.

27. The method of claim 26, wherein the code for analyzing includes code for determining a plurality of optimizations.

28. The method of claim 26 further comprising:

code for validating data in the cache on the client computer.

29. The method of claim 28 wherein the code for validating data comprises:

code for generating a first checksum for the data in the cache on the client computer; and code for sending the first checksum to a refresh agent on the server computer over the network link;

wherein the refresh agent generates a second checksum for corresponding data on the server computer and compares the first and second checksums.

30. In a computer network providing a distributed storage system, the computer network including a server computer and a client computer where objects stored on the server computer are accessible by the client computer via a network link, a method of enhancing performance of the client computer comprising the steps of:

intercepting, at a cache subsystem, selective ones of system calls issued from an operating system and intended for transmission over the network link to the server computer, the operating system being separate from the cache subsystem;

analyzing, for each intercepted operating system call, current and selective ones of past operating system calls to determine whether the current intercepted operating system call can be serviced locally by utilizing a cache on the client computer; and if the intercepted operating system call is serviceable locally,
generating an enhanced system operation responsive to the intercepted operating system call, and
performing the enhanced system operation; or if the intercepted operating system call is not serviceable locally, sending the intercepted operating system call to the server computer.

31. The method of claim 30 further comprising:
intercepting, at the cache subsystem, selective ones of system calls issued from an application and intended for transmission over the network link to the server computer;
analyzing, for each intercepted application system call, current and selective ones of past application system calls to determine whether the current intercepted application system call can be serviced locally by utilizing the cache on the client computer; and
if the intercepted application system call is serviceable locally,
generating an enhanced application operation responsive to the intercepted application system call, and performing the enhanced application operation; or if the intercepted application system call is not serviceable locally, sending the intercepted application system call to the server computer.

32. The method of claim 30, wherein the analyzing step includes determining a plurality of optimizations.

33. The method of claim 30 wherein the performing step comprises:
validating data in the cache on the client computer.

34. The method of claim 33 wherein the validating step comprises:
generating a first checksum for the data in the cache on the client computer;
sending the first checksum to a refresh agent on the server computer over the network link;
generating, at the refresh agent, a second checksum for corresponding data on the server computer; and
comparing the first and second checksums.

\* \* \* \* \*